United States Patent
Huang

(10) Patent No.: US 11,920,366 B2
(45) Date of Patent: Mar. 5, 2024

(54) WATER CIRCULATION SYSTEM FOR A POOL AND A POOL

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 184 days.

(21) Appl. No.: 17/628,155

(22) PCT Filed: Jul. 16, 2020

(86) PCT No.: PCT/CN2020/102453
§ 371 (c)(1),
(2) Date: Jan. 18, 2022

(87) PCT Pub. No.: WO2021/013045
PCT Pub. Date: Jan. 28, 2021

(65) Prior Publication Data
US 2022/0268044 A1    Aug. 25, 2022

(30) Foreign Application Priority Data

Jul. 19, 2019   (CN) .......................... 201910653252.7
Jul. 19, 2019   (CN) .......................... 201921138048.3
(Continued)

(51) Int. Cl.
*E04H 4/12*   (2006.01)
*E04H 4/00*   (2006.01)
*E04H 4/06*   (2006.01)

(52) U.S. Cl.
CPC ......... *E04H 4/1245* (2013.01); *E04H 4/0025* (2013.01); *E04H 4/06* (2013.01)

(58) Field of Classification Search
CPC ....... E04H 4/1245; E04H 4/0025; E04H 4/06; E04H 4/1209; E04H 4/12; B01D 35/306; B01D 35/027
(Continued)

(56) References Cited

U.S. PATENT DOCUMENTS

| 5,682,624 A | 11/1997 | Ciochetti |
| 5,809,587 A | 9/1998 | Fleischer |
| 2019/0032351 A1 | 1/2019 | Huang et al. |

FOREIGN PATENT DOCUMENTS

| CN | 106567564 | 4/2017 |
| CN | 206309075 | 7/2017 |

(Continued)

OTHER PUBLICATIONS

Examination report No. 1 for your standard patent application dated Apr. 17, 2023 (dated Apr. 17, 2023) issued on related Australian patent application 202031649 by the Australian Government / IP Australia.
(Continued)

*Primary Examiner* — Lori L Baker
(74) *Attorney, Agent, or Firm* — DICKINSON WRIGHT PLLC

(57) ABSTRACT

A water circulation system for a pool comprises a water outlet assembly mounted to an inner wall of a pool, and in fluid communication with an external pump through a water outlet pipe. The water circulation system also includes an air inlet assembly mounted to the pool a preset distance from the water outlet assembly, and an air outlet assembly attached to the water outlet assembly and in fluid communication with the water outlet assembly. An air inlet passage connects the air inlet assembly to the air outlet assembly, so external air can enter the air inlet assembly and be introduced to the water outlet assembly through the air outlet assembly. Air is introduced to the water outlet by the air (Continued)

outlet when the water outlet assembly is blocked, reducing negative pressure at the water outlet and reducing risk that a portion of a user's body is drawn against or into the water outlet.

26 Claims, 31 Drawing Sheets

(30)  Foreign Application Priority Data

Nov. 28, 2019 (CN) .......................... 201911187017.1
Nov. 28, 2019 (CN) .......................... 201922088453.5

(58) Field of Classification Search
 USPC ............................................ 4/506–507, 509
 See application file for complete search history.

(56)  References Cited

FOREIGN PATENT DOCUMENTS

| CN | 207332380 | 5/2018 |
|---|---|---|
| CN | 209114919 | 7/2019 |
| EP | 3135841 | 3/2017 |
| JP | H10216426 | 8/1998 |
| WO | 1996018335 | 6/1996 |
| WO | 9631264 | 10/1996 |
| WO | 2006047381 | 5/2006 |
| WO | 2016181209 | 11/2016 |

OTHER PUBLICATIONS

German website with English translation—Anonymous: Eheim 4005651 Diffuser for Installation Set 2 and for Hose Diameter 16/22 mm—Cited Reference XP055944825 Jan. 31, 2013 (Jan. 31, 2013) Retrieved from the Internet: URL: https://www.amazon.de/eheim-4005651-Diffusor-Installationsset-Schlauchdurchmesser/dp/B001J55M9E/ref=sr_1_5?_mk_dw_DW=AMAZON&Crid=3TTRIXLMLC0SI&Keywords=Diffusor+EHEIM&qid=1658387772&sprefix=difusor+eheim,aps,73&sr=8-5&th=1 [retrived on Jul. 21, 2022]—the whole document.

Extended European Search Report dated Aug. 30, 2022 (dated Aug. 30, 2022) issued on related European patent applciation 20844278.0 by the European Patent Office.

Written Opinion of the International Searching Authority dated Oct. 15, 2020 (dated Oct. 15, 2020) issued on related International patent application PCT/CN2020/102453 by the National Intellectual Property Administration, PRC China.

WATER CIRCULATION SYSTEM FOR A POOL AND A POOL

CROSS REFERENCE TO RELATED APPLICATIONS

This utility patent application is a U.S. National Phase patent application of and claims priority to PCT/CN2020/102453, filed Jul. 16, 2020, which claims the benefit and priority of Chinese invention patent application CN 201910653252.7, filed Jul. 19, 2019, Chinese utility model patent application CN 201921138048.3, filed Jul. 19, 2019, Chinese invention patent application CN 201911187017.1, filed Nov. 28, 2019, and Chinese utility model patent application CN 201922088453.5, filed Nov. 28, 2019, the full content of each of which are herein incorporated by reference.

TECHNICAL FIELD

The present disclosure relates to the technical field of circulating filtration for pools. More specifically, the present disclosure relates to a water circulation system for a pool. The present disclosure further relates to a water circulation system configured to reduce risk of injury from a user's body part being drawn into a water outlet from which an external pump draws water out of the pool.

BACKGROUND

Many conventional pools are provided with a water outlet and a water inlet to circulate water for filtration and for heating, with a pump drawing water out of the pool through the water outlet and returning the water back to the pool through the water inlet. Many conventional pools also include a filter at the water outlet of the pool. Such filters commonly include a shield to protect a user's skin or hair from being drawn into or onto the water outlet as a result negative pressure at the water outlet. As shown in FIG. 1a, a pool 1 is provided with a water inlet 3 in fluid communication with an external pump 2 and a water outlet 4 with a filter 5. If the filter 5 is removed, but not replaced with a new filter, suction at the water outlet may draw the user's body or hair against or into the water outlet. In some cases, this suction may be powerful enough that the user may be unable to free themself from the water outlet, which can result in injury to the user.

In some conventional pools, a water circulation system is provided with two water outlets to increase user safety. As shown in FIG. 1b, in addition to a water outlet 4 with a filter 5a, another water outlet is provided with a filter 5b. In this way, when one of the water outlets is blocked, the suction at the blocked water outlet 4 is reduced because water continues to flow out of the other (i.e., unblocked) water outlet, so that the danger to the user can be avoided. The two water outlets are typically spaced apart by a long distance to prevent one user from being able to make contact with the two water outlets at the same time so as to ensure safety. For some pools, such as massage pools and above-ground pools, the available area is limited, and therefore, the positions of the water outlets can affect a user's experience, so large spacing between two water outlets can result in a waste of usable space. Furthermore, large spacing between multiple water outlets can reduce production efficiency.

SUMMARY

In accordance with various embodiments of the present disclosure, a water circulation system for a pool comprises a water outlet assembly mounted to an inner wall of the pool and in fluid communication with an external pump through a water outlet pipe. The water circulation system also includes an air inlet assembly mounted to the pool a preset distance from the water outlet assembly, and an air outlet assembly attached to the water outlet assembly and in fluid communication with the water outlet assembly. The water circulation system also includes an air inlet passage connecting the air inlet assembly to the air outlet assembly, wherein fluid can enter the air inlet assembly and be introduced to the water outlet assembly through the air outlet assembly.

In accordance with various embodiments of the present disclosure, a water circulation system for a pool comprises a water inlet assembly mounted to an inner wall of the pool and in fluid communication with an external pump through a water inlet pipe. The water circulation system also includes a water outlet assembly mounted to the inner wall of the pool and in fluid communication with the external pump through a water outlet pipe, and an auxiliary suction assembly mounted to the inner wall of the pool. The auxiliary suction assembly is in fluid communication with the water outlet assembly when the water outlet assembly is disconnected from a filter, and the auxiliary suction assembly is blocked from fluid communication with the water outlet assembly when the water outlet assembly is connected to the filter.

In accordance with various embodiments of the present disclosure, a water circulation system for a pool comprises a water outlet assembly mounted to an inner wall of the pool, the water outlet assembly being configured to draw water out of the pool. The water circulation system also includes an air inlet assembly mounted to the pool spaced apart from the water outlet assembly and configured to draw in ambient air. The water circulation system also includes an air outlet assembly in communication with the water outlet assembly for introducing air to the water outlet assembly when the water outlet assembly is blocked, and an air inlet passage configured to convey air from the air inlet assembly to the water outlet assembly.

In accordance with various embodiments of the present disclosure, a water circulation system for a pool comprises a water outlet assembly mounted to an inner wall of the pool. The water outlet assembly is configured to draw water out of the pool. The water circulation system also includes an auxiliary suction assembly mounted to the inner wall of the pool. The auxiliary suction assembly is in fluid communication with the water outlet assembly when the water outlet assembly is disconnected from a filter for introducing fluid to the water outlet assembly when the water outlet assembly is blocked. The auxiliary suction assembly is blocked from fluid communication with the water outlet assembly when the water outlet assembly is connected to the filter.

BRIEF DESCRIPTION OF THE DRAWINGS

To understand the present disclosure, it will now be described by way of example, with reference to the accompanying drawings in which implementations of the disclosure are illustrated and, together with the description below, serve to explain the principles of the disclosure.

FIG. 13b shows an enlarged view of region A of FIG. 13a;

FIG. 14b shows an enlarged view of region B in FIG. 14a;

DETAILED DESCRIPTION

The present disclosure provides exemplary embodiments of a water circulation system for a pool, and a pool fitted with such a water circulation system. The exemplary embodiments of the present disclosure are described below with reference to the drawings for illustration. The structural positions of various components, e.g., upper, lower, top, bottom, etc., are not absolute, but relative. The orientation expressions are appropriate when the various components are arranged, as shown in the figures, but should change accordingly when the positions of the various components in the figures change.

The pool or pools described herein may be above-ground pools or in-ground pools, in which the above-ground pools include, but are not limited to, inflatable pools, massage pools, hot tubs, support pools and the like. An inflatable pool is shown as an example.

As used herein, "inner" refers to the direction toward a water storage area of a pool, and "outer" refers to the direction towards the exterior of the whole pool. "Gas" refers to any gas, such as air, that can be introduced from the outside atmosphere or from an apparatus, and "fluid" includes both gas and liquid, such as a gas flow and a water flow.

Figure 1A:
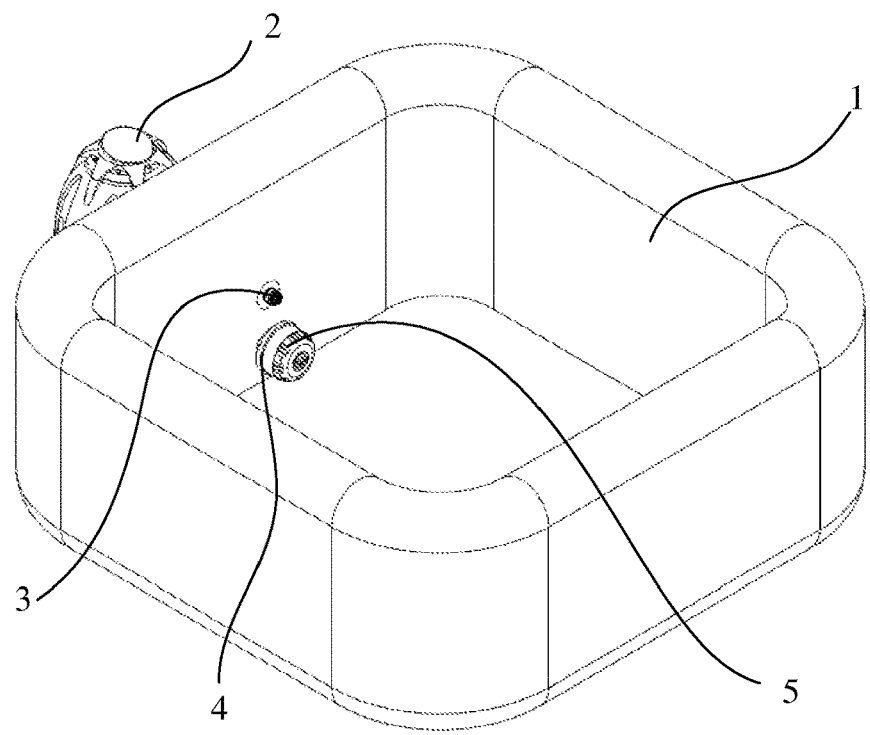
FIG. 1a is a perspective view of a pool with a water circulation system having one water outlet.
Figure 1B:
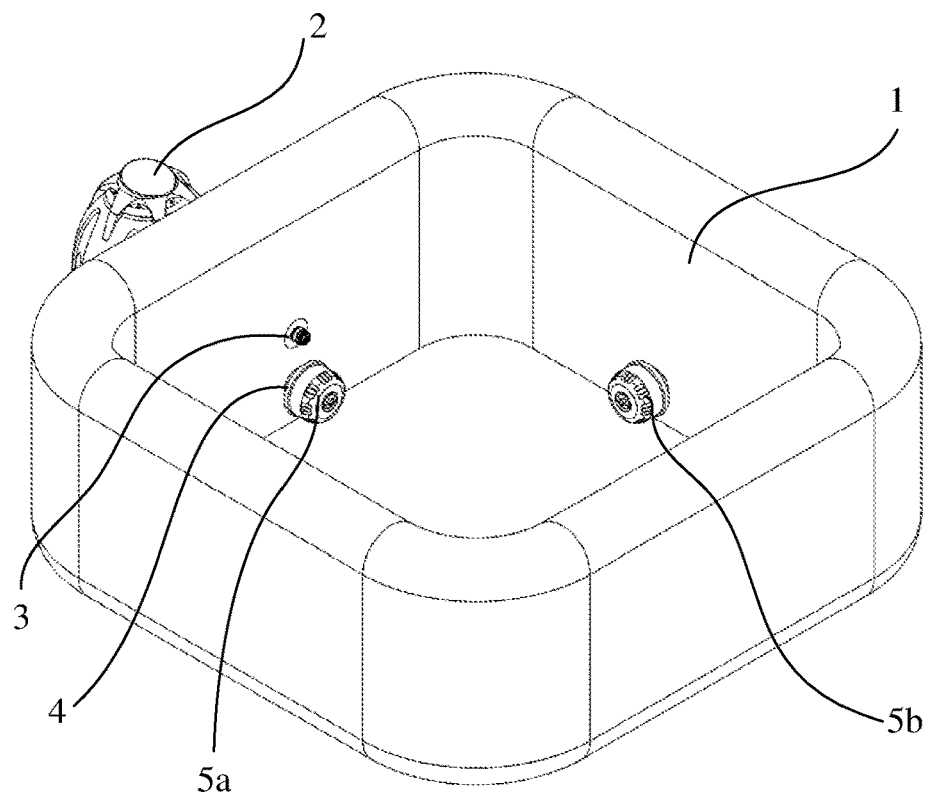
FIG. 1b is a perspective view of a pool with a water circulation system having two water outlets.
Figure 2A:
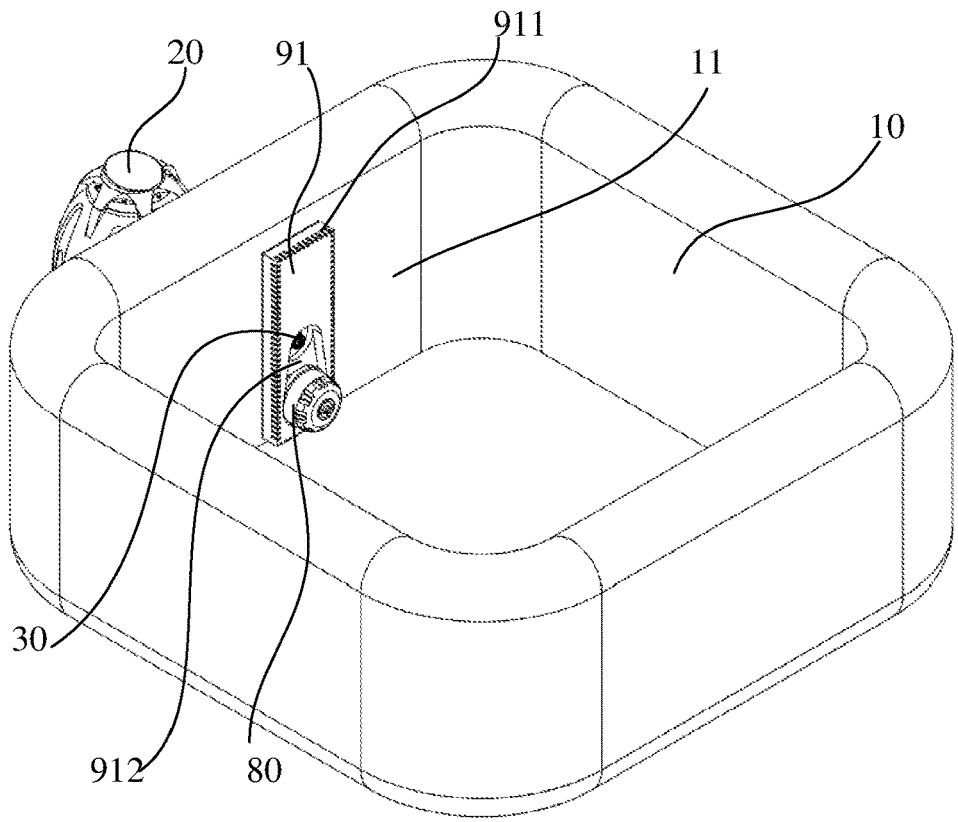
FIG. 2a is a perspective view of a pool including a water circulation system according to various embodiments of the present disclosure.
Figure 2B:
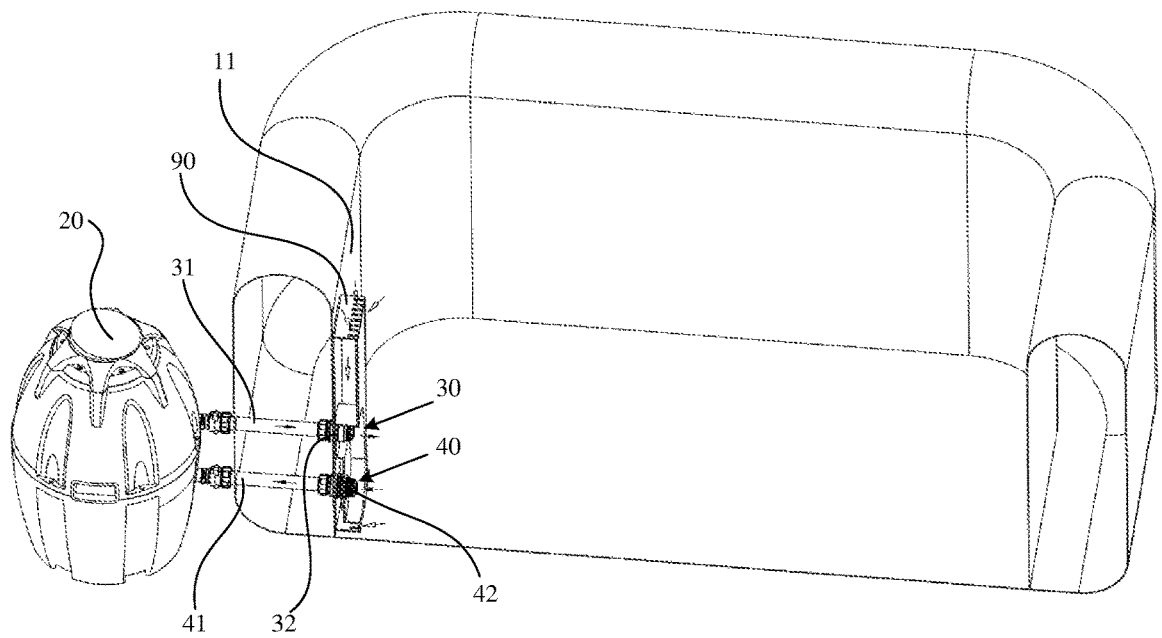
FIG. 2b is a cross-sectional view of the water circulation system of FIG. 2a, without a filter connected thereto.

A water circulation system for a pool generally comprises a water inlet assembly 30 and a water outlet assembly 40. As shown in FIGS. 2a and 2b, the water inlet assembly 30 is mounted to an inner wall 11 of the pool 10, with a water inlet device 32 in fluid communication with an external pump 20 through a water inlet pipe 31. A water outlet assembly 40 is mounted to the inner wall 11, with a water outlet device 42 in fluid communication with the external pump 20 through a water outlet pipe 41. A filter 80 may be mounted to the water outlet device 42.

According to various embodiments of the present disclosure, a water circulation system with an air inlet assembly 60 and an air outlet assembly 50 is provided, wherein the air inlet assembly 60 is connected to the air outlet assembly 50 through an air inlet passage 63. The air inlet assembly 60 is mounted to the pool a preset distance from a water outlet assembly 40, and the air outlet assembly 50 is attached to the water outlet assembly 40 on the inner wall 11 of the pool and in fluid communication with the water outlet assembly 40. When a water outlet of the water outlet assembly 40 is blocked, the water circulation system can introduce external air from the air inlet assembly 60 to the air outlet assembly 50 through the air inlet passage 63 and then to the water outlet assembly 40 via the air outlet assembly 50. In this way, when the water outlet assembly 40 is not blocked, water flow from the pool can flow into a water outlet pipe 41 in a normal way, and then flow into the pool via an external pump 20 and a water inlet pipe 31. When the water outlet assembly 40 is blocked by an obstruction, such as part of a user's body or hair, the external pump 20 continues operation, and negative pressure is generated at the water outlet of the water outlet assembly 40. This negative pressure can make it difficult to remove the obstruction or body from the water outlet assembly 40. However, with the water circulation system of the present disclosure, air is introduced to the flow path of water flow to reduce the negative pressure at the water outlet, thereby reducing the suction force at the water outlet which can act upon the user's body or hair, the resulting reduction of suction force effectively protecting the user.

In various embodiments, the air outlet assembly 50, 90 of the water circulation system may be configured to be in fluid communication with the water outlet assembly 40 when the water outlet assembly 40 is not connected to a filter 80, but not in fluid communication with the water outlet assembly 40 when the water outlet assembly 40 is connected to the filter 80. In this way, when the filter 80 is not installed at the water outlet assembly 40, water and/or air can flow into the water outlet pipe 41 from the air outlet assembly 50, 90, as well as from the water outlet assembly 40. Even if the water outlet of the water outlet assembly 40 is blocked, water flow or air flow can still flow from the air outlet assembly 50, 90 to the water outlet pipe 41, thereby effectively protecting the user. When the filter 80 is installed on the water outlet assembly 40, water flow can only flow into the water outlet pipe 41 via the filter 80, thereby providing the filtering effect.

Various embodiments are described below in conjunction with the drawings so that those skilled in the art could fully understand the present disclosure. Some components, such as the water inlet assembly, the external pump and the filter, may comprise any suitable known components, and therefore, are not further described below.

As mentioned above, the air outlet assembly 50, 90 of the present disclosure may be configured to accommodate the filter 80. FIGS. 2a to 2e show a water circulation system for a pool according to a first embodiment of the present disclosure. In various embodiments, and as shown in FIGS. 2a and 2b, the air outlet assembly 90 comprises a shell 91 fixed to the inner wall 11 of the pool. The shell 91 includes an installation port 912 for receiving the water outlet assembly 40. The shell 91 defines a plurality of air inlets, such as those provided by grille 911. In various embodiments, at least part of the grille 911 is located above a desired in-use water level of the pool, and the shell 91 has an internal cavity to define a fluid passage in fluid communication with the water outlet assembly 40. As shown in the embodiment of FIGS. 2a to 2e, the installation port 912 of the shell 91 may also receive the water inlet assembly 30. Particularly, in this embodiment, the shell 91 serves as both an air inlet assembly and an air outlet assembly, and the internal cavity of the shell 91 also defines the air inlet passage. Other embodiments of the present disclosure include the air inlet assembly mounted to the inner wall, the top wall or the outer wall of the pool. In some embodiments, the pool 10 is an inflatable pool, and the air inlet passage 63 is disposed in an air chamber of the inflatable pool.

Figure 2C:
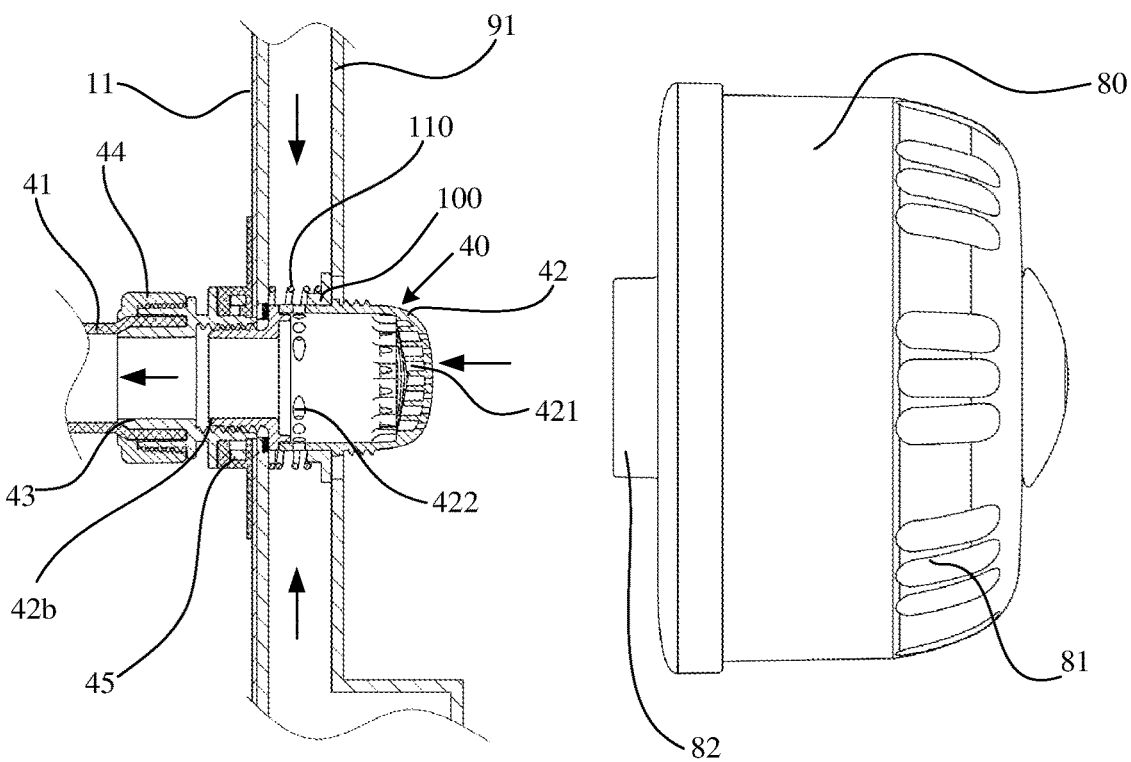
FIG. 2c is a cross-sectional view of a water outlet assembly of the water circulation system of FIG. 2a, showing a fluid path at a water outlet without a filter connected thereto.

In the embodiment shown in FIGS. 2a to 2e, the water outlet device 42 is at least partially located inside the shell 91, and the water outlet device 42 includes a plurality of water outlet orifices 421 and a plurality of through holes 422 in a side wall thereof. In addition, a circumferential side wall of the water outlet device 42 includes external threads that cooperate with internal threads of the filter 80, so that a user can conveniently install the filter 80 onto the water outlet device 42. The plurality of through holes 422 may be on or adjacent to the external threads of the water outlet device 42, but the through holes 422 do not affect the connection function of the external threads. In various embodiments, the water outlet device may be provided with a water outlet device joint 42b connected to the inner wall of the pool. The water outlet device joint 42b may be integrally formed or separately connected with the water outlet device 42. The through holes 422 may be circumferentially arranged in the side wall of the water outlet device 42 and adjacent to the water outlet device joint 42b, as shown in FIG. 2c, thereby providing fluid communication between the internal cavity of the shell 91 and the water outlet assembly 40 via the through holes 422.

In various embodiments, the air outlet assembly 50 is in fluid communication with the water outlet assembly 40 when the water outlet assembly 40 is not connected to the filter 80, and the air outlet assembly is not in fluid communication with the water outlet assembly when the water outlet assembly 40 is connected to the filter 80. Advantageously, the through holes 422 of the water outlet device 42 may be selectively blocked from fluid communication with the air outlet assembly 50 by a water flow blocking member. In this embodiment, an elastic member 110, such as a coil spring, is sheathed on a side wall of the water outlet device 42. A base 100 is provided inside of the shell 91 such that the elastic member 110 abuts against the inner wall 11 of the pool or the inner wall of the shell 91. That is, the base 100 serves as the water flow blocking member, and the elastic member 110 biases the base 100 away from the through holes 422. When the water outlet assembly 40 is not connected to the filter 80, referring to FIGS. 2b and 2c, after the pump 20 is started, part of the water flow and air enter the shell 91 through the grille 911 of the shell 91, and then enters the water outlet pipe 41 from the shell 91 via the through holes 422 of the water outlet device 42, as indicated by the depicted arrows. At the same time, the other part of the water flow enters the water outlet pipe 41 through the water outlet orifices 421 of the water outlet device 42. The water flow then flows through the pump 20 and the water inlet pipe 31 from the water outlet pipe 41, finally returning to the pool 10 through the water inlet device 32, thereby providing circulating filtration for the pool.

It should be understood here that, in this embodiment, when the water outlet assembly is not connected to the filter 80, if the water outlet assembly is blocked by a portion of a human body, hair or other obstruction, because the air outlet assembly is in communication with the water outlet assembly, air can enter through the grille 911 of the shell, enter the water outlet pipe 41 via the through holes 422 of the water outlet device 42, then flow through the pump 20 and the water inlet pipe 31 from the water outlet pipe 41, and finally return to the pool 10 through the water inlet device 32. That is, when the water outlet device is not connected to the filter 80 and the water outlet device is blocked, because air in the fluid path continues to circulate, the negative pressure at the water outlet device is partially reduced, and the user can free themself from suction at the water outlet more easily to avoid injury.

Figure 2D:
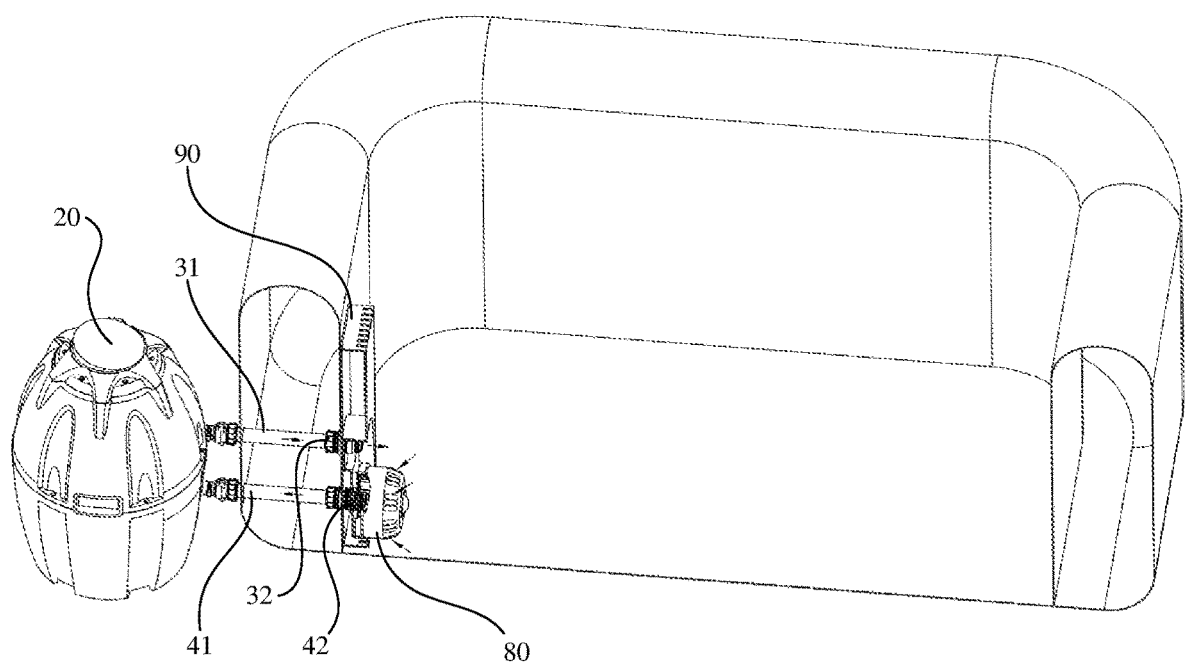
FIG. 2d is a cross-sectional view of the water circulation system of FIG. 2a, with a filter connected thereto.
Figure 2E:
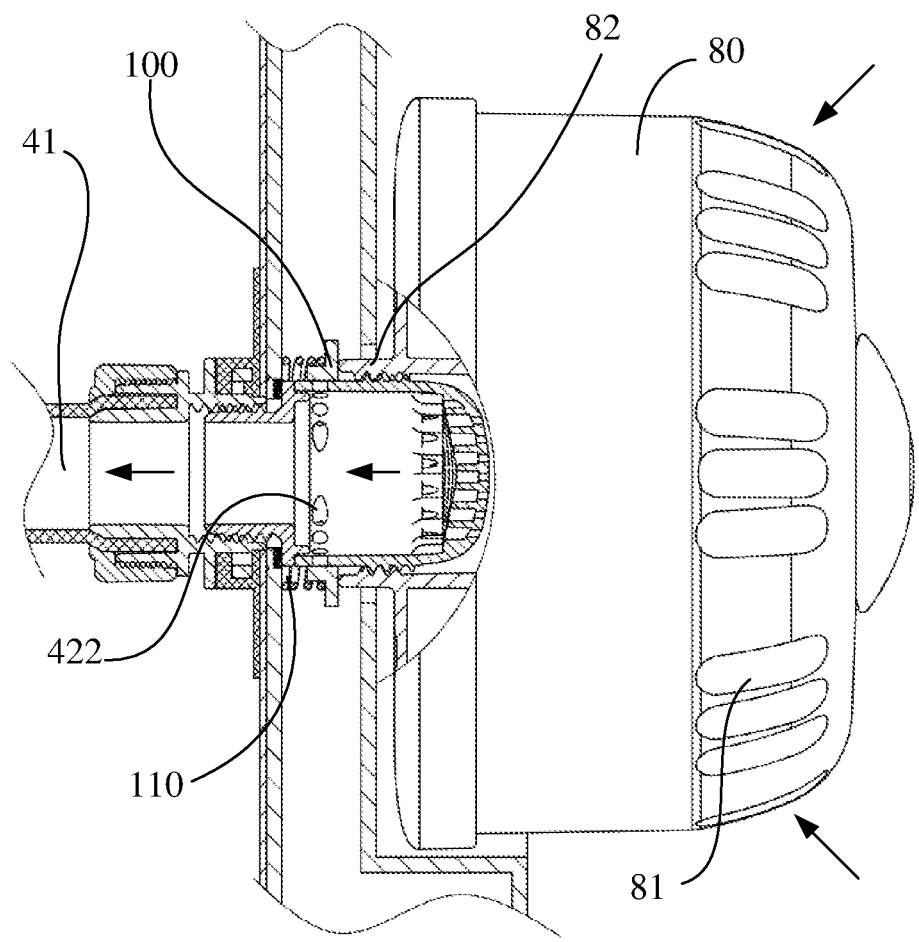
FIG. 2e is a cross-sectional view of a water outlet assembly of the water circulation system of FIG. 2a, showing a fluid path at a water outlet with a filter connected thereto.

After the filter 80 is installed to the water outlet assembly 40, as shown in FIGS. 2d and 2e, the filter 80 is provided with a plurality of filter ports 81 and a connection interface 82. Once the connection interface 82 of the filter 80 is made, for example, by means of threaded connection, to the water outlet device 42, the connection interface 82 abuts against the base 100, urging the base 100 to move toward the water outlet pipe 41, compressing the elastic member 110 and causing the base 100 to block the through holes 422 in the side wall of the water outlet device 42. At this time, the fluid passage in the shell 91 is not in communication with the water outlet device 42, and water flow cannot enter the water outlet pipe 41 via the through holes 422, but can only flow in through the filter ports 81 of the filter 80, as indicated by the depicted arrows, and then return to the pool via the water outlet pipe 41, the pump 20, the water inlet pipe 31 and the water inlet device 32. After the filter 80 is removed, it should be understood that the base 100 is reset under the action of the elastic member 110 to abut against the inner wall of the shell 91, and the through holes 422 are in fluid communication with the shell 91 again. In this way, after the filter 80 is installed, water flow can only flow into the water outlet pipe via the filter, thereby providing the filtering effect.

In various embodiments, and as shown in FIGS. 2b and 2c, the water outlet assembly 40 may comprise a water outlet pipe connector connecting the water outlet pipe 41 in fluid communication with the water outlet device 42. In various embodiments, the water outlet pipe connector comprises a water outlet pipe joint 43 connected to the water outlet pipe 41, and a water outlet device joint 42b connected to the water outlet pipe joint 43 for connection to the water outlet device 42. As shown in FIG. 2c, one end of the water outlet pipe joint 43 may be, for example, connected to the water outlet pipe 41 by a nut 44, and the other end may be, for example, fixed to the inner wall 11 of the pool by a flexible connector 45 fixed to the inner wall 11 of the pool. In various embodiments, the water outlet pipe joint 43 may be connected to the flexible connector 45 by means of secondary injection molding. In addition, the water outlet device joint 42b is hermetically connected to the inner wall 11 of the pool.

Figure 3A:
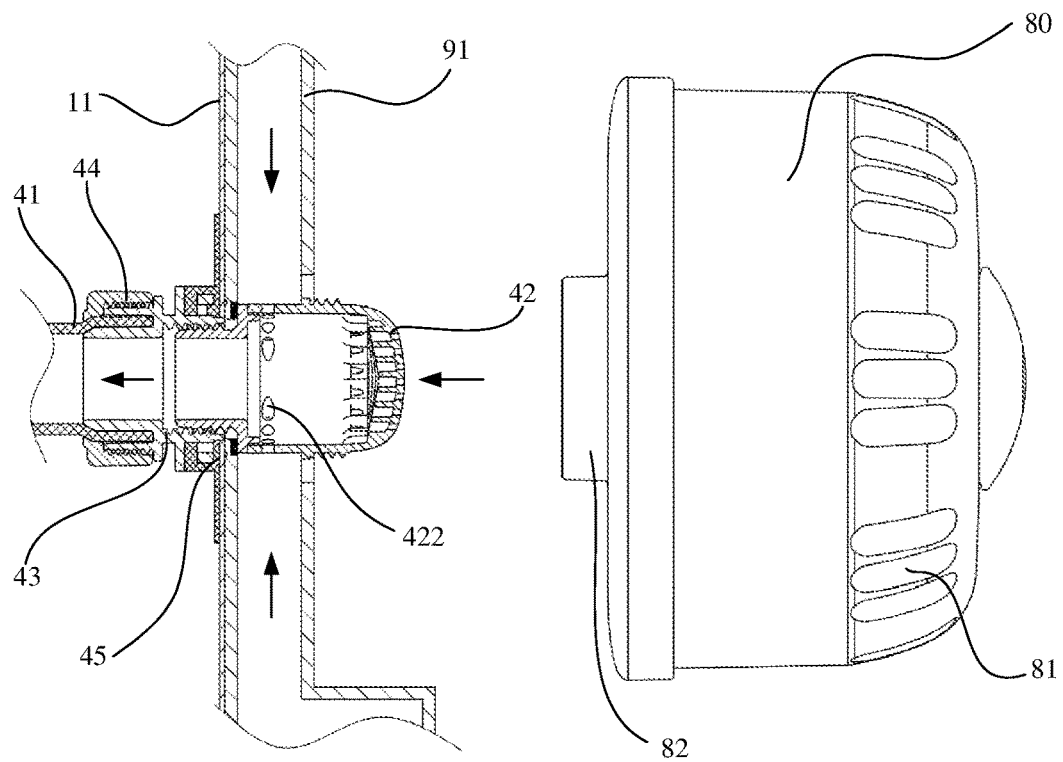
FIG. 3a is a cross-sectional view of a water outlet assembly of a water circulation system for a pool according to various embodiments of the present disclosure, showing a fluid path without a filter connected thereto.
Figure 3B:
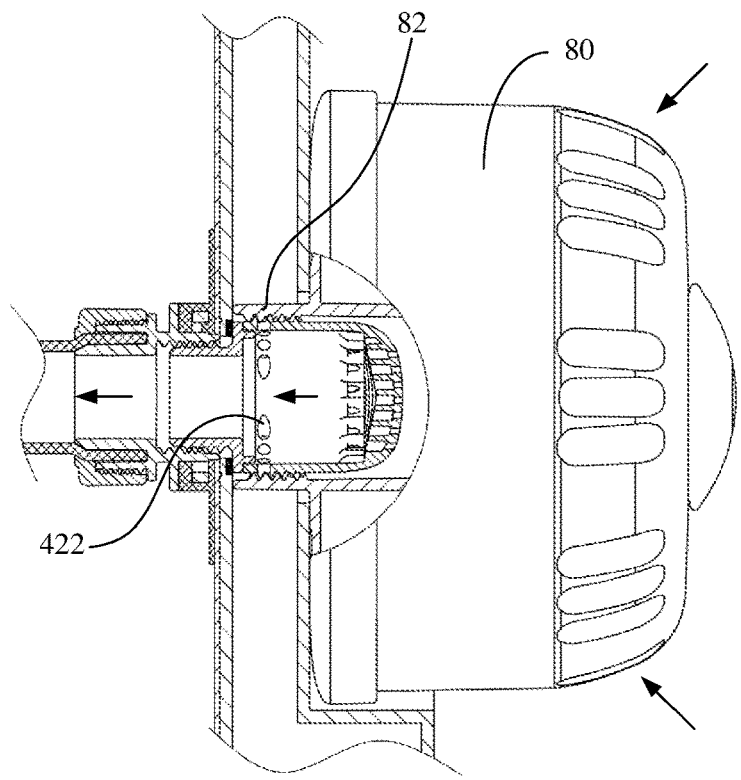
FIG. 3b is a cross-sectional view of the water outlet assembly of FIG. 3a, showing a fluid path with a filter connected thereto.

FIGS. 3a and 3b show a water circulation system according to a second embodiment of the present disclosure. This second embodiment is different from the embodiment described above and shown in FIGS. 2a-2e in that the water outlet device 42 of FIGS. 3a-3b does not include an elastic member or a base. Instead, the water flow blocking member is the connection interface 82 of the filter 80, and when the filter 80 is installed to the water outlet device 42, the through holes 422 are directly blocked by the connection interface 82, as shown in FIG. 3b. Thus, in this configuration, water flow cannot enter the water outlet pipe from the shell 91, or only an extremely small amount of water flow can enter the water outlet pipe from the shell 91. Similarly, water flows in from the filter ports 81 of the filter 80, as indicated by the depicted arrows, and then returns to the pool via the water outlet pipe 41, the pump 20, the water inlet pipe 31 and the water inlet device 32.

Figure 4A:
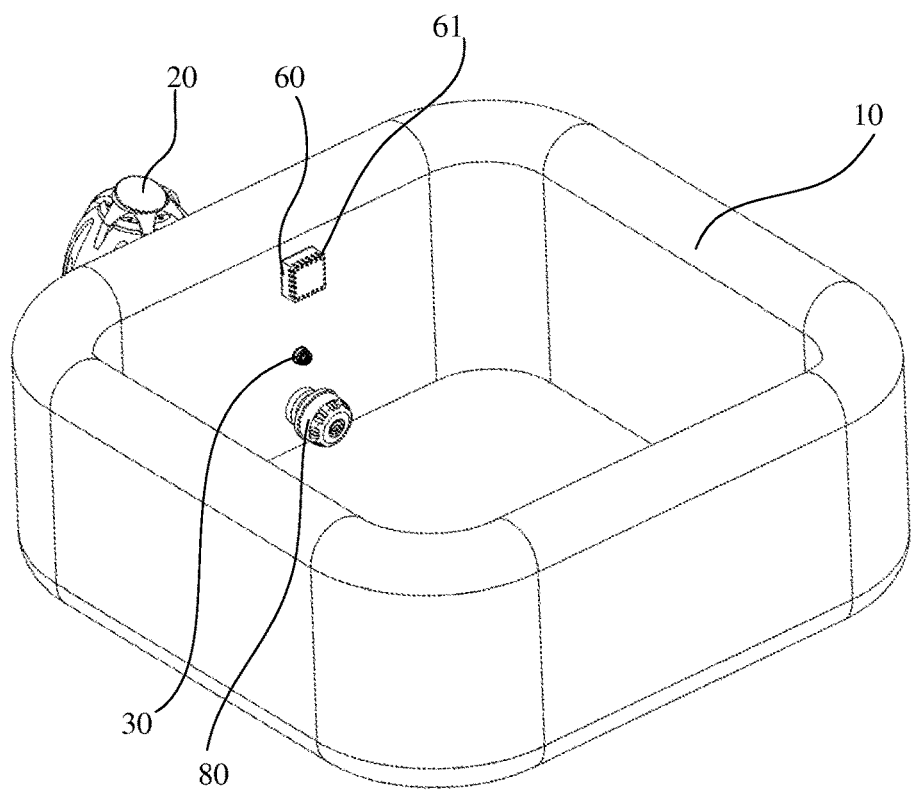
FIG. 4a is a perspective view of a pool including a water circulation system according to various embodiments of the present disclosure.
Figure 4B:
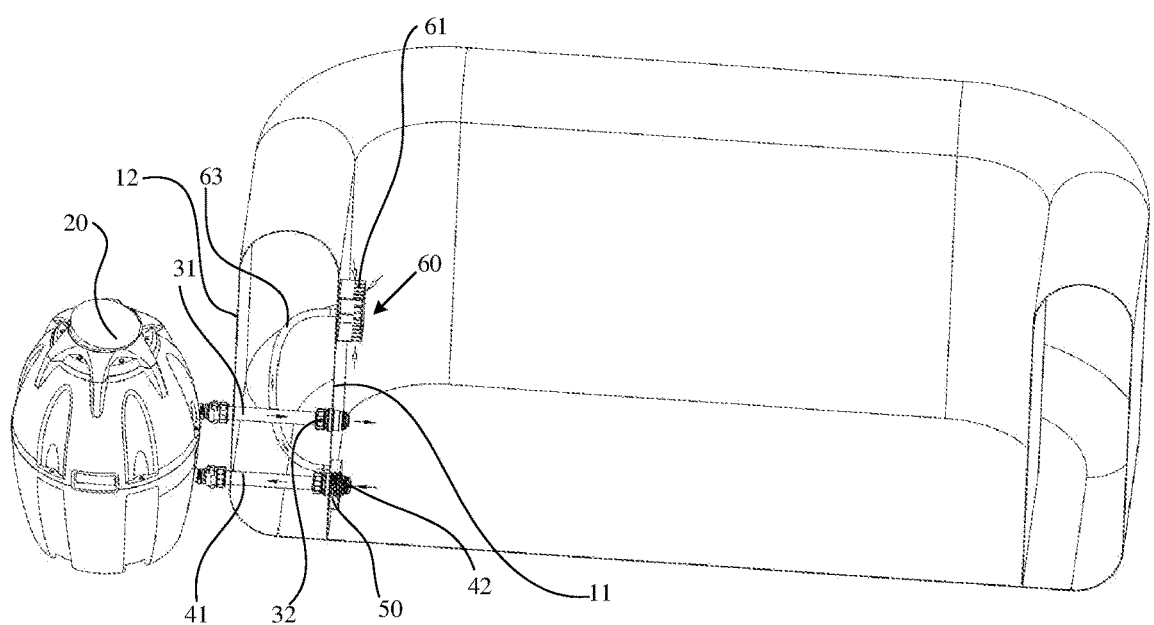
FIG. 4b is a cross-sectional view of the pool of FIG. 4a, showing the water circulation system without a filter connected thereto.

FIGS. 4a to 4g show a water circulation system according to a third embodiment of the present disclosure. In this embodiment, the air inlet assembly 60 comprises an air inlet outer cover 61 installed on the inner wall 11 of the pool. The air inlet outer cover 61 is provided with a plurality of air inlets 611, for example, as the air inlets of the outer cover grille. As shown in FIG. 4b, the air inlet passage 63 is arranged between the inner wall 11 and the outer wall 12 of the pool and is connected to the air inlet outer cover 61 and the air outlet assembly 50 by means of joints, respectively. In this way, in embodiments in which a cavity is provided within the walls of the pool (for example, such as may be provided by an inflatable pool), the air inlet passage can be arranged within the inflatable chamber like the water inlet pipe and the water outlet pipe, so as to avoid failure due to damage that may otherwise be sustained when placed outside of the wall of the pool. The air inlet passage 63 may comprise, for example, a flexible hose, and may be thus easily sheathed on the joint to achieve fluid communication between the air inlet outer cover 61 and the air outlet assembly 50.

Figure 4C:
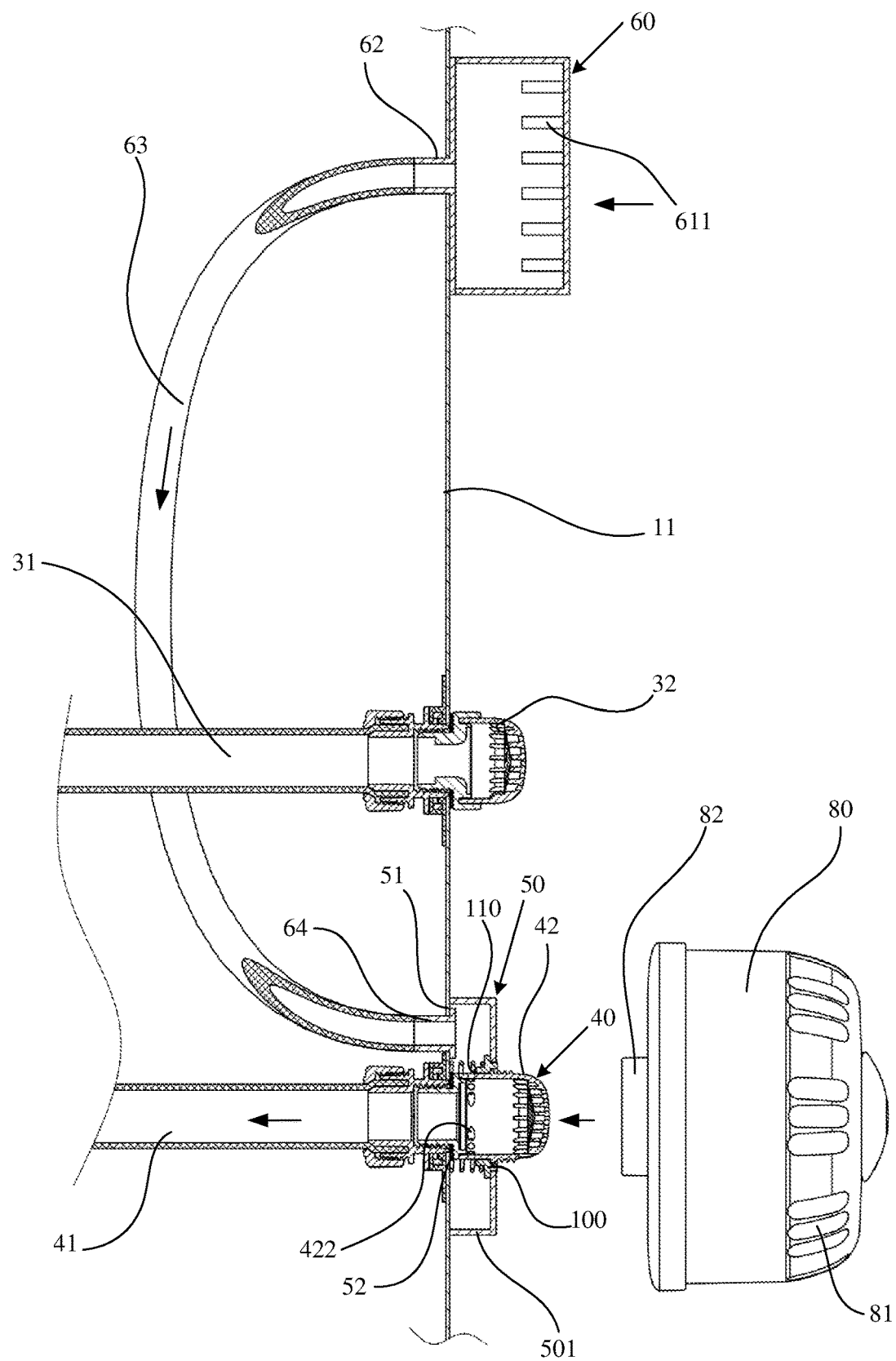
FIG. 4c is a cross-sectional view of an inner wall of the pool of FIG. 4a, showing a fluid path in the water circulation system without a filter connected thereto.

In this embodiment, the air outlet assembly 50 comprises a shell 501 fixed to the inner wall 11 of the pool. As shown in FIG. 4c, the shell 501 is provided with a first installation port 51 for installation of the air inlet passage 63 and a second installation port 52 for installation of the water outlet assembly, wherein the shell 501 has an internal cavity to connect the air inlet passage with the water outlet assembly.

The air inlet assembly 60 may be mounted a preset distance from the water outlet assembly 40. In this embodiment, the air inlet outer cover 61 is located at an upper part of the inner wall 11 of the pool. In various embodiments, at least some of the air inlets 611 are above the in-use water level of the pool. In this way, since at least some of the air inlets 611 of the air inlet outer cover 61 are exposed to the outside atmosphere when in normal use, even if the air inlets below the water surface are blocked, the flow of gas, such as air, can still be introduced through the air inlets 611 above the water surface, thus ensuring that fluid flow can continue to enter the air outlet assembly 50 from the air inlet passage 63 and then enter the water outlet pipe 41 from the air outlet assembly 50. Since air enters the water outlet pipe 41 more easily, the negative pressure at the water outlet of the water outlet assembly 40 is greatly reduced, thereby reducing the risk of drawing the user's body or hair against or into the water outlet assembly 40.

In various embodiments, and as shown in FIGS. 4b and 4c, the air inlet passage 63 may be connected to the air inlet outer cover 61 and the shell 501 by means of a joint provided on the air inlet outer cover 61 and the shell 501, where each joint may be integrally molded or cooperatively connected with the air inlet outer cover 61 or the shell 501. Specifically, a first joint 62 may be integrally formed on the air inlet outer cover 61, and a second joint 64 may be connected to the shell 501. In various different embodiments, at least one of the joints 62, 64 may be fixed with a rubber coating to the inner wall of the pool, the top wall of the pool, or the outer wall of the pool. In various embodiments at least one of the joints 62, 64 may be integrally formed with the air inlet outer cover 61 and/or the shell 501 of the air outlet assembly 50.

Figure 4D:
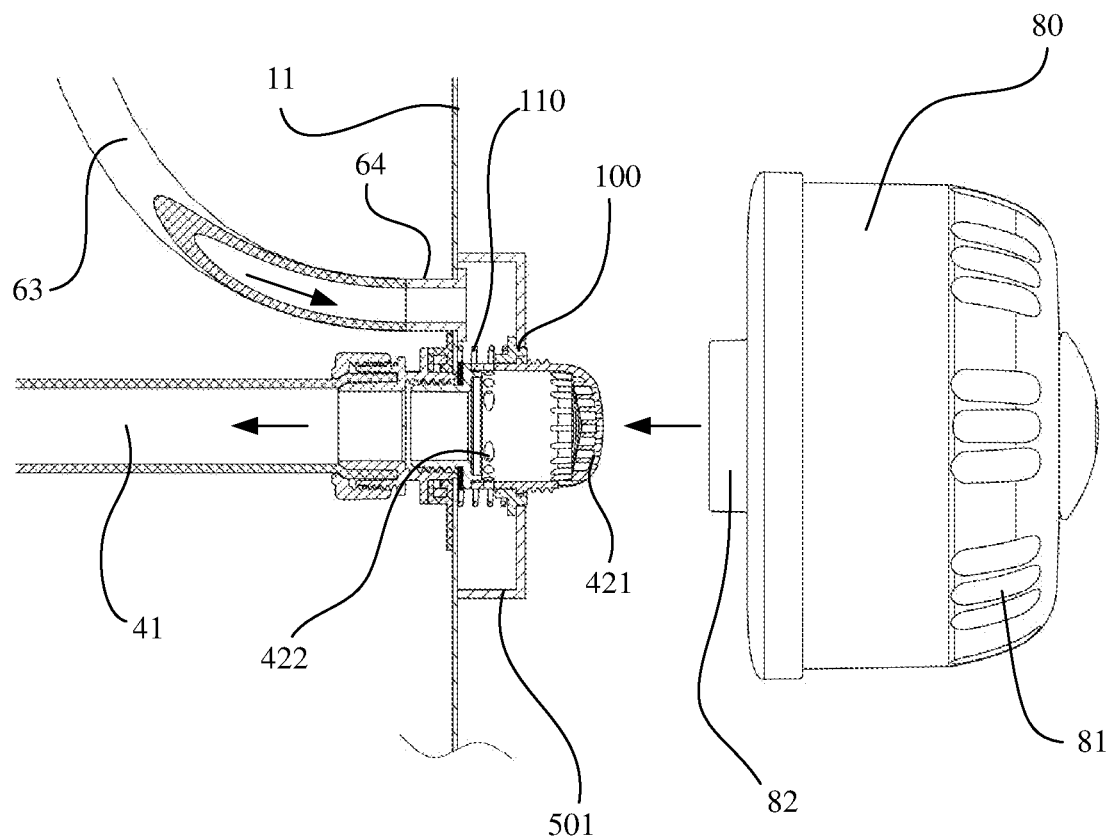
FIG. 4d is a cross-sectional view of the water outlet of the water circulation system of FIG. 4a, showing a fluid path without a filter connected thereto.
Figure 4E:
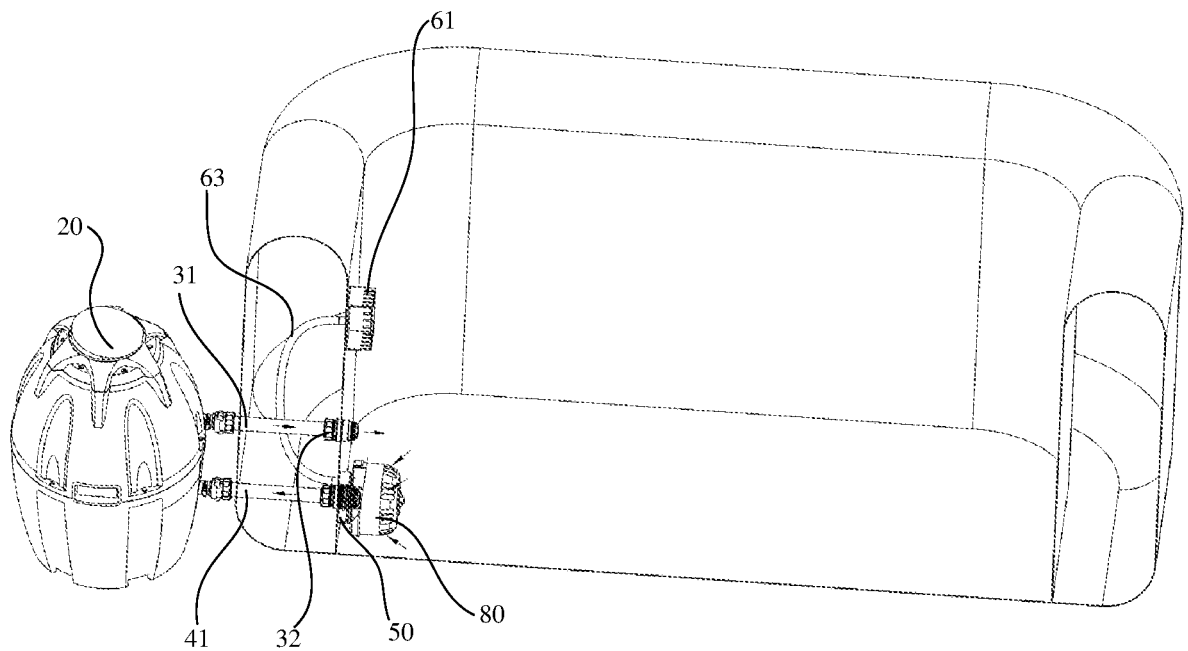
FIG. 4e is a cross-sectional view of the pool of FIG. 4a, showing a fluid path in the water circulation system with a filter connected thereto.
Figure 4F:
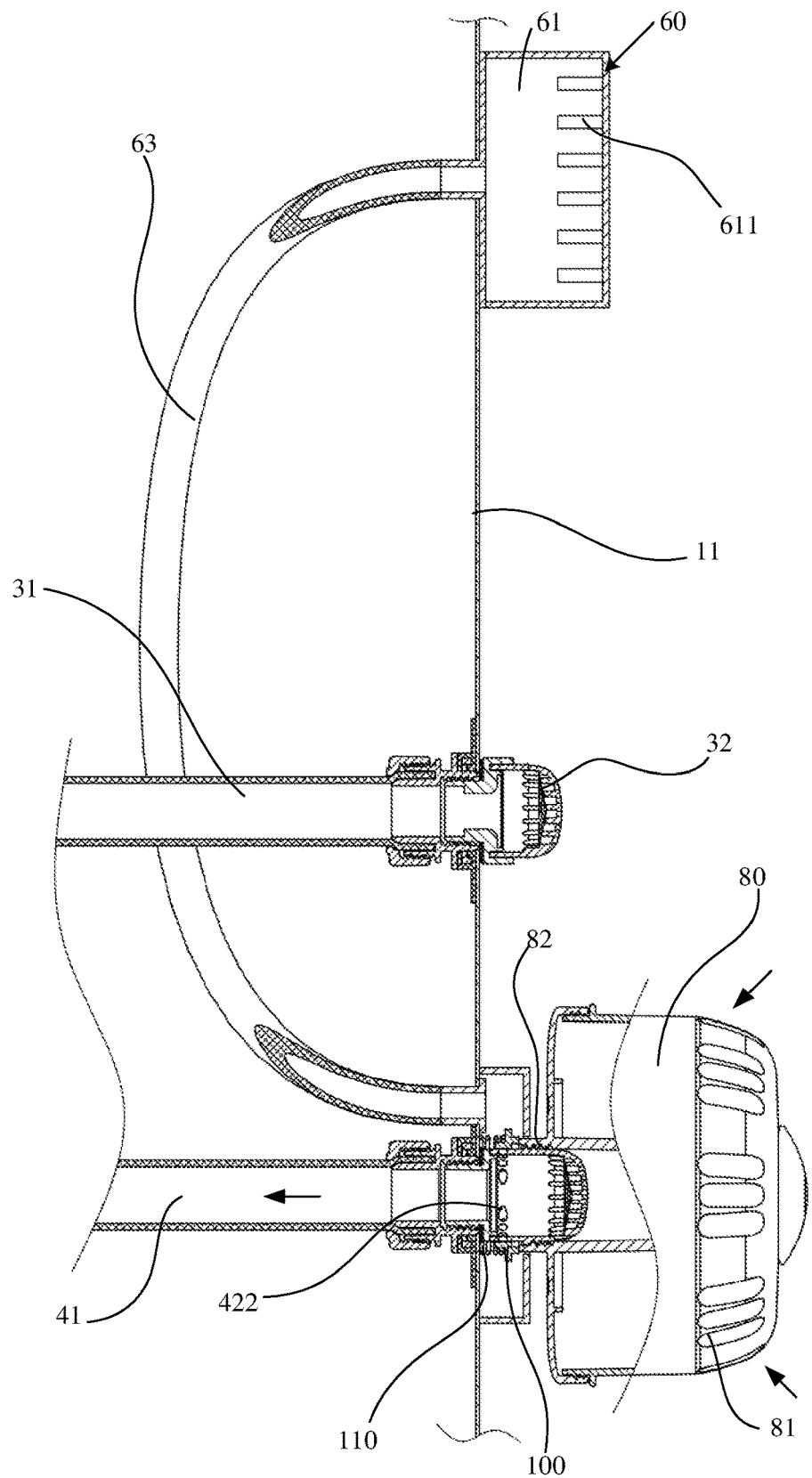
FIG. 4f is a cross-sectional view of an inner wall of the pool of FIG. 4a, showing a fluid path in the water circulation system with a filter connected thereto.
Figure 4G:
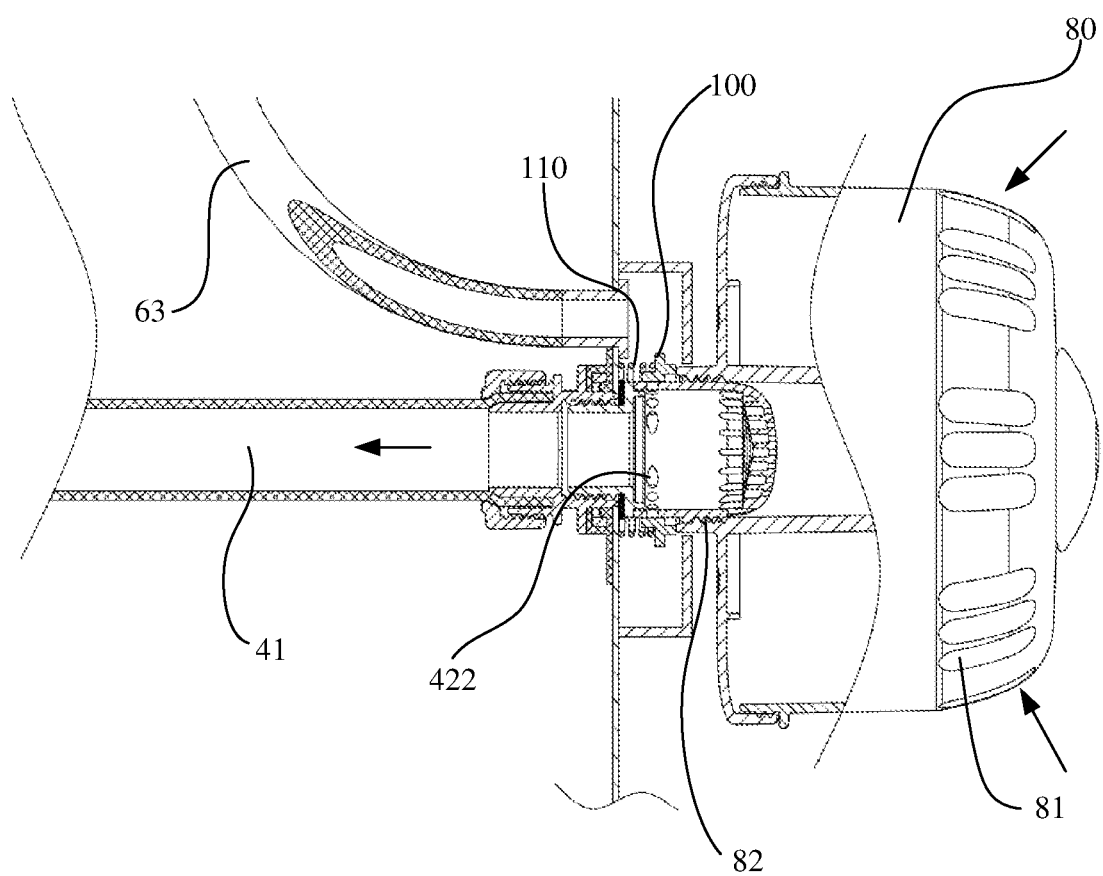
FIG. 4g is a cross-sectional view of the water outlet of the water circulation system of FIG. 4a, showing a fluid path with a filter connected thereto.

Similar to the first embodiment, in this embodiment, an elastic member 110 is sheathed on the side wall of the water outlet device 42, and the base 100 serves as a water flow blocking member. When the water outlet assembly 40 is not connected to the filter 80, as shown in FIGS. 4b to 4d, part of the fluid flow (including air and/or water) enters the shell 501 from the air inlets 611 of the air inlet outer cover 61 via the air inlet passage 63, as indicated by the depicted arrows, and then enters the water outlet pipe 41 from the shell 501 via the through holes 422 of the water outlet device 42. At the same time, another part of the fluid flow enters the water outlet pipe 41 through the water outlet orifices 421 of the water outlet device 42. After the filter 80 is installed on the water outlet assembly 40, as shown in FIGS. 4e to 4g, the connection interface 82 of the filter 80 abuts against the base 100, urging the base 100 to move towards the water outlet pipe 41 and squeezing the elastic member 110, causing the base 100 to block the through holes 422 in the side wall of the water outlet device 42. Water flows in from the filter ports 81 of the filter 80, as indicated by the depicted arrows, and then returns to the pool via the water outlet pipe 41, the pump 20, the water inlet pipe 31 and the water inlet device 32.

Figure 5A:
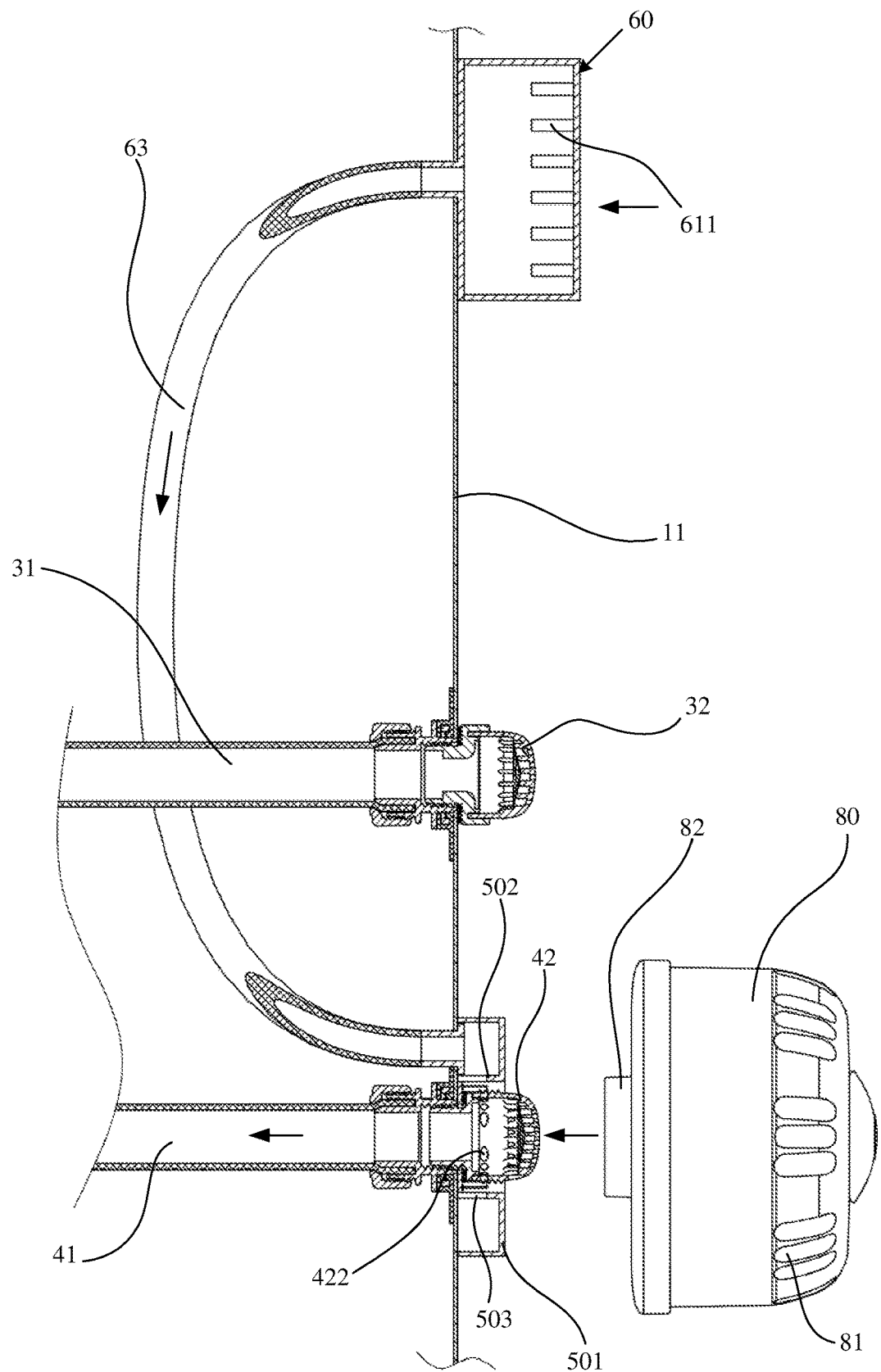
FIG. 5a is a cross-sectional view of an inner wall of a pool with a water circulation system according to various embodiments of the present disclosure, showing a fluid path in the water circulation system without a filter connected thereto.

FIGS. 5a to 5d show a water circulation system according to a fourth embodiment. The water circulation system of FIGS. 5a to 5d is different from the water circulation system shown in FIGS. 4b to 4d in that the water outlet device 42 is not provided with an elastic member or a base. In addition, as shown in FIG. 5a, the shell 501 of the water outlet assembly includes an annular wall 502 extending axially towards the internal cavity, and an opening 503 formed in the annular wall 502.

Figure 5B:
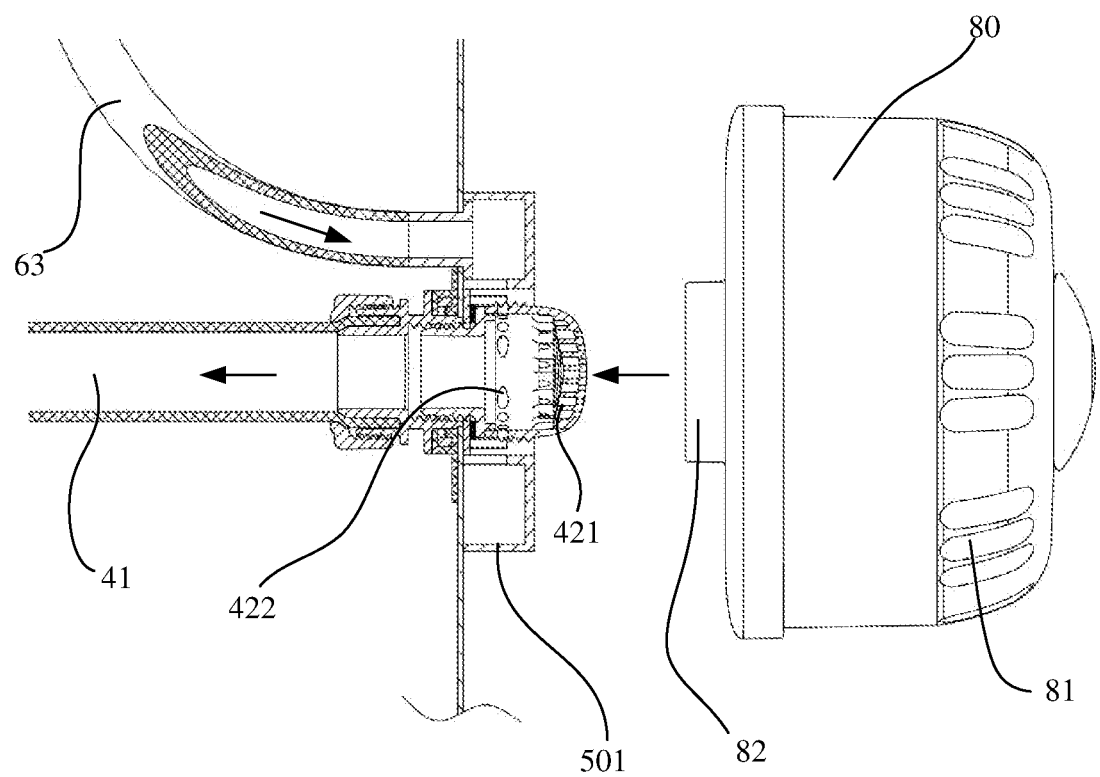
FIG. 5b is a cross-sectional view of the water outlet of the water circulation system of FIG. 5a, showing a fluid path without a filter connected thereto.
Figure 5C:
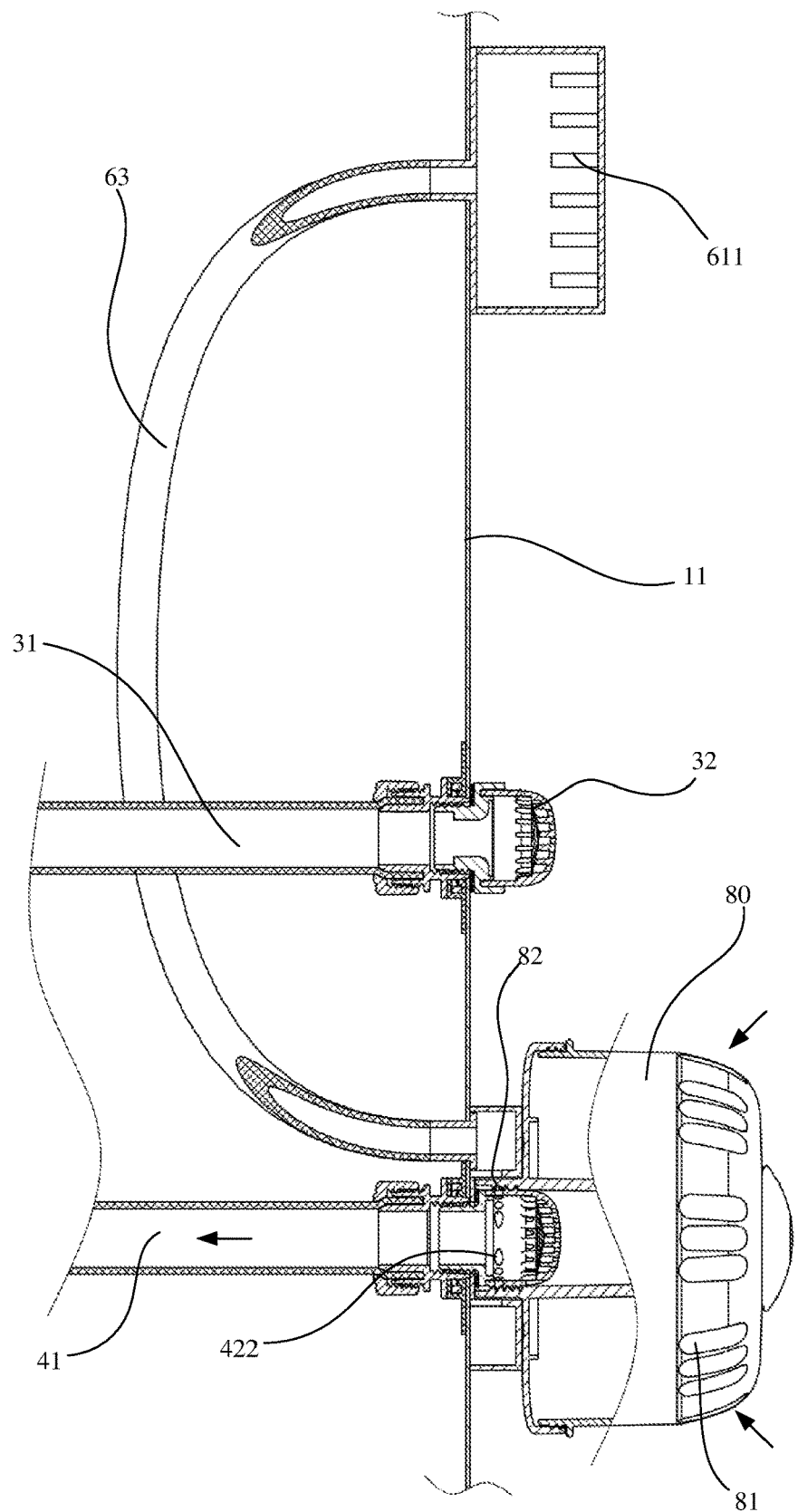
FIG. 5c is a cross-sectional view of the inner wall of the pool of FIG. 5a, showing a fluid path in the water circulation system with a filter connected thereto.
Figure 5D:
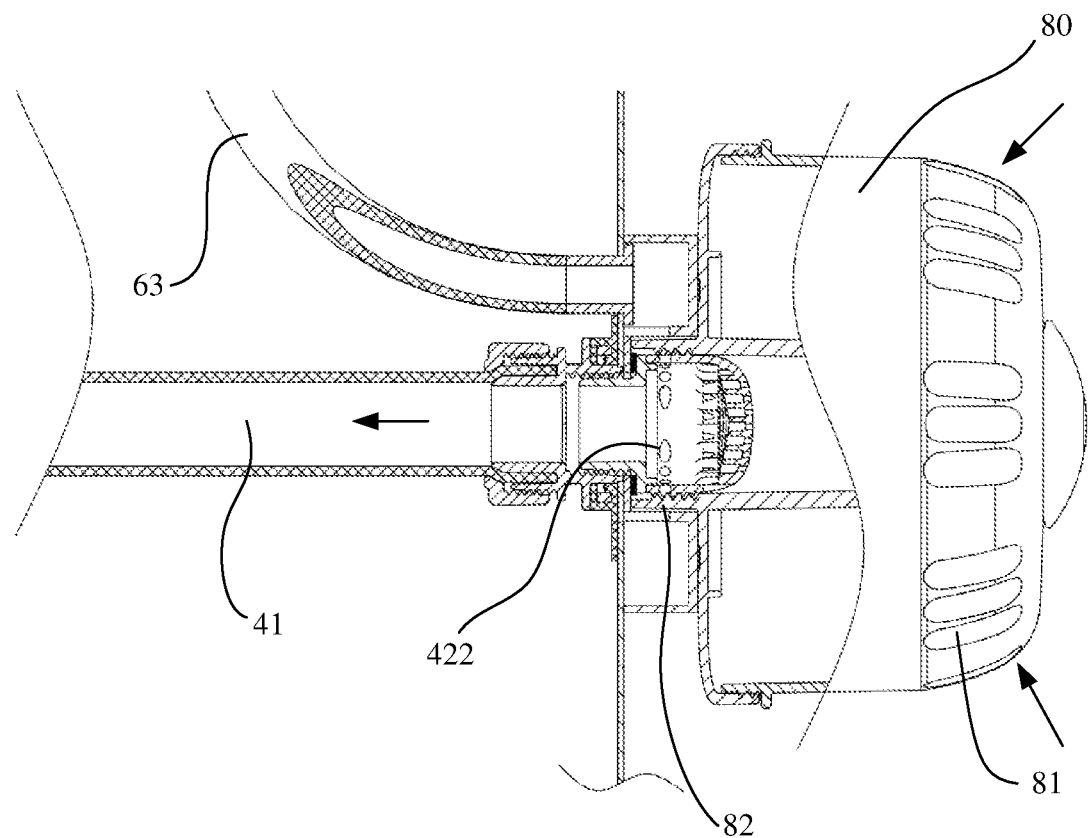
FIG. 5d is a cross-sectional view of the water outlet of the water circulation system of FIG. 5a, showing a fluid path with a filter connected thereto.

When the water outlet device 42 is not connected to the filter 80, as shown in FIGS. 5a and 5b, part of the fluid flow (including air and/or water) enters the shell 501 from the air inlets 611 of the air inlet outer cover 61 via the air inlet passage 63, as indicated by the depicted arrows, and then enters the water outlet pipe 41 from the opening 503 of the shell 501 via the through holes 422 of the water outlet device 42. At the same time, another part of the fluid flow enters the water outlet pipe 41 through the water outlet orifices 421 of the water outlet device 42. Thus, when the filter 80 is connected to the water outlet device 42 of the water outlet assembly, as shown in FIGS. 5c and 5d, the connection interface 82 of the filter 80 serves as a water flow blocking member to block the through holes 422, and thus as shown in FIGS. 5c and 5d, water flow can only flow into the water outlet pipe 41 from the filter ports 81 of the filter 80, as indicated by the depicted arrows.

Figure 6:
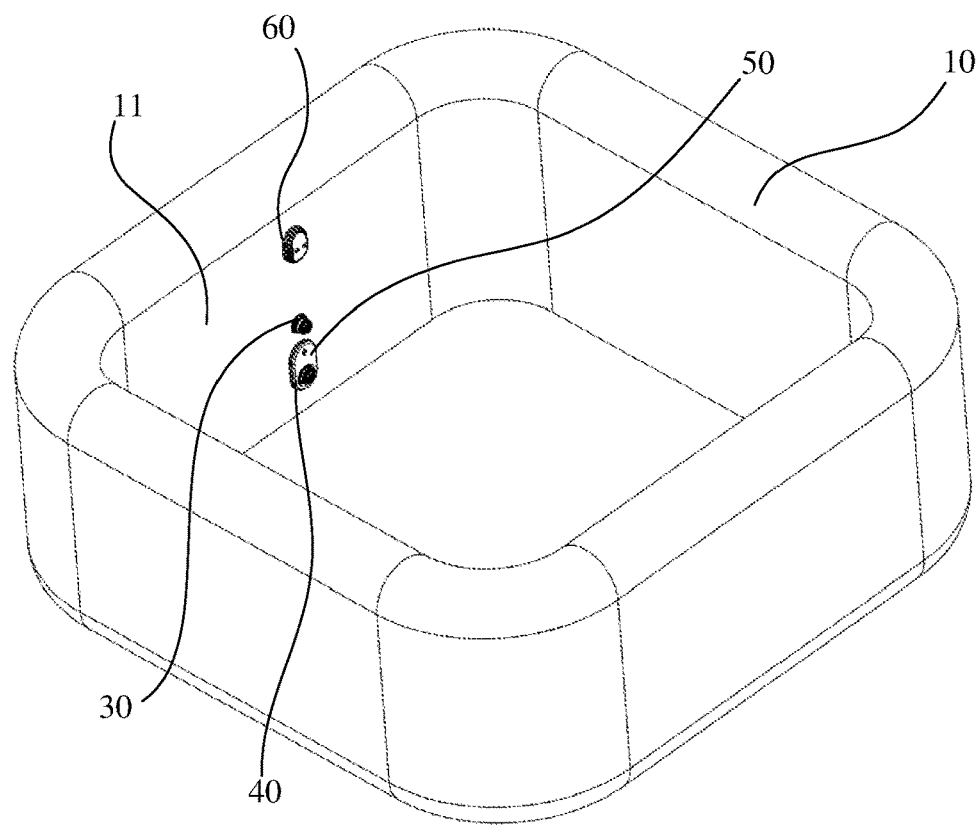
FIG. 6 is a perspective view of a pool including a water circulation system according to various embodiments of the present disclosure.
Figure 7:
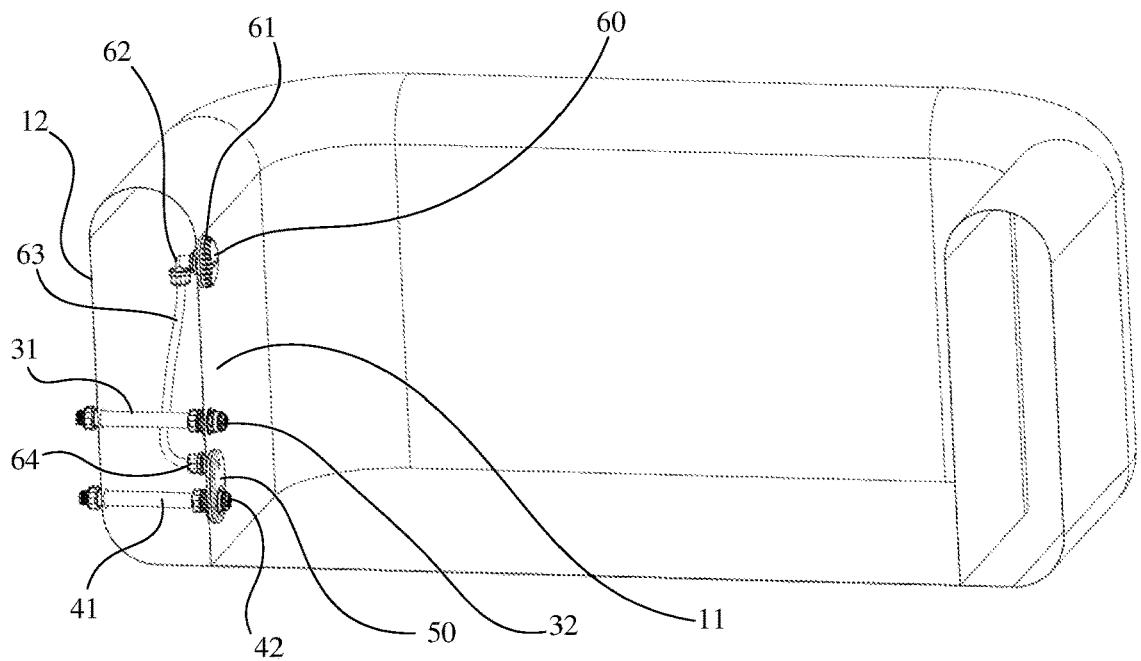
FIG. 7 is a cross-sectional view of the pool of FIG. 6, including parts of the water circulation system.
Figure 8:
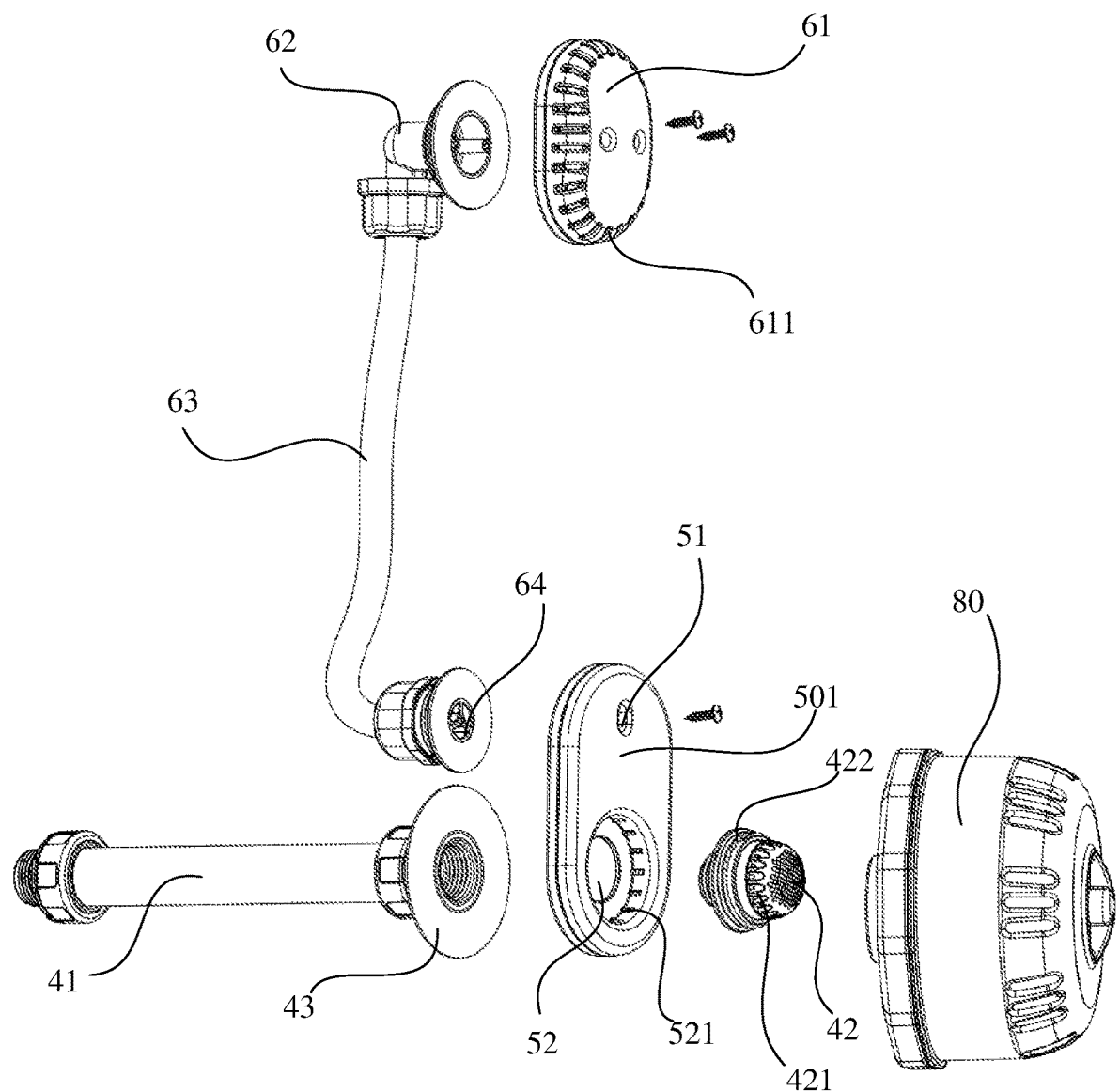
FIG. 8 is an exploded schematic view of an air inlet assembly, an air outlet assembly, a water outlet assembly and a filter of the water circulation system of FIG. 6.

FIGS. 6 and 7 show a water circulation system for a pool according to a fifth embodiment Similar to other embodiments, the air inlet assembly 60 of the fifth embodiment comprises an air inlet outer cover 61 installed to the inner wall 11 of the pool. The air inlet outer cover 61 is provided with a plurality of air inlets 611 in the form of a grille, as shown in FIG. 8. In the illustrated embodiment, the air outlet assembly 50 comprises a shell 501 fixed to the inner wall 11 of the pool, and the shell 501 is provided with a first installation port 51 for installation of the air inlet passage 63 and a second installation port 52 for installation of the water outlet assembly 40. Similarly, a recessed portion that sinks into the internal cavity of the shell 501 may be formed at the second installation port 52 to receive at least part of the water outlet assembly. Optionally, the first installation port 51 and the second installation port 52 may be provided with first air holes and second air holes in fluid communication with the internal cavity. For example, second air holes 521 may be formed in the annular side wall of the recessed portion at the second installation port 52, as shown in FIG. 8.

Figure 9:
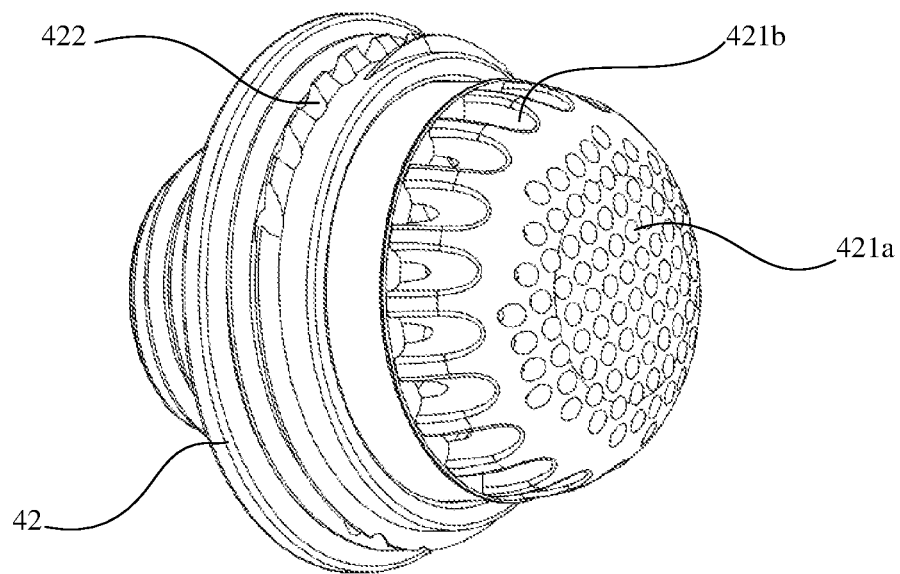
FIG. 9 is a perspective view of a water outlet device of a water outlet assembly according to various embodiments of the present disclosure.

In this embodiment, the water outlet device 42 is received in the recessed portion at the second installation port 52 and is thus at least partially located inside of the shell 501. In this way, after the water outlet is installed, an annular gap may be formed between the outer circumference of the water outlet device and the shell 501, more specifically, between the outer circumference of the water outlet device and the inner circumference of the recessed portion, as shown in FIG. 13b. As shown in more detail in FIG. 9, the water outlet device 42 comprises a plurality of water outlet orifices 421, such as a plurality of water outlet orifices 421a provided on an end surface and a plurality of water outlet orifices 421b provided on a side surface to achieve a certain filtering effect. The plurality of water outlet orifices 421 may have substantially the same size and/or shape. Alternatively, the plurality of water outlet orifices 421 may have different shapes and/or sizes. Advantageously, a plurality of through holes 422 are circumferentially arranged adjacent to the inner wall of the pool on the circumferential side wall of the water outlet device 42. Similarly, second air holes 521, adjacent to the second installation port 52, are circumferentially arranged adjacent to the inner wall of the pool such that fluid communication exists between the air outlet assembly and the water outlet assembly through the second air holes 521 and the through holes 422. Advantageously, in the illustrated embodiment, the first installation port 51 and the second installation port 52 of the shell 501 are configured such that when the water outlet assembly is blocked, and more specifically, when the gap between the outer circumference of the water outlet device 42 and the inner circumference of the recessed portion of the shell 501 is blocked, as shown in FIG. 14b, the shell 501 and the water outlet device 42 form a substantially closed space. When the water outlet device 42 is blocked but this gap is not blocked, as shown in FIG. 13b, the water outlet assembly is still in fluid communication with the pool. When this gap is blocked, for example, if the water outlet is blocked by a portion of a user's body, a substantially closed space is formed between the shell 501 and the water outlet device 42. It should be understood that "closed" here does not means being completely closed. In a closed case, a large amount of fluid is blocked, and therefore, cannot enter from the water outlet device; however, a small amount of fluid may still flow into the shell 501. At this time, water flow cannot smoothly enter the water outlet pipe 41 from the water outlet device 42. Due to the operation of the pump, the internal pressure of the outlet pipe is reduced; external air enters the air outlet assembly from the air inlet assembly through the air inlet passage and is then introduced into the water outlet pipe through the through holes of the water outlet device; and fluid continues to circulate to partially reduce the negative pressure at the water outlet device, so that a user's body may escape from the water outlet device more easily to avoid injury.

When the filter 80 is installed on the water outlet device 42 by means of threads, the through holes 422 are blocked by the connection interface 82 of the filter, so that water flow can only be circulated through the filter 80 and the water outlet device 42. At this time, the filter ports of the filter 80, for example, in the form of a grille, are kept at a certain distance from the water outlet device, which can ensure that the water outlet device will not be blocked. At the same time, water flows through a filter element of the filter to filter the water flowing therethrough.

Figure 11:
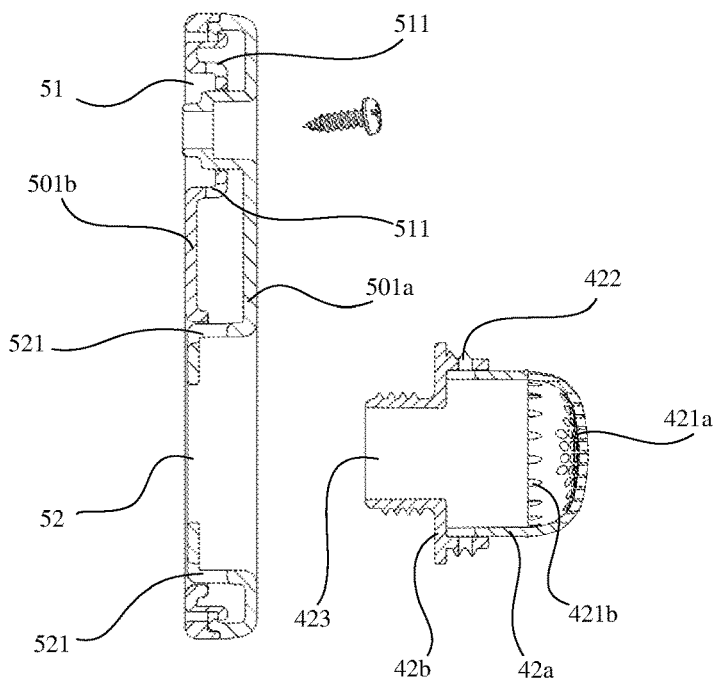
FIG. 11 is a cross-sectional view of a shell of the air outlet assembly and a water outlet device of the water circulation system of FIG. 6.

In various embodiments, as described above, the water outlet device 42 may be connected to the water outlet pipe 41 via an integrally molded or separately connected water outlet device joint. For example, as shown in FIG. 11, the water outlet device may comprise a water outlet device portion 42a and a water outlet device joint 42b, and the water outlet device joint 42b may pass through the second installation port 52. In this embodiment, the plurality of through holes 422 are provided in the circumferential side wall of the water outlet device joint 42b. When the water outlet device 42 is installed with the water outlet pipe 41 via the shell 501 of the air outlet assembly 50, as shown in in exploded form in FIG. 8, the water outlet device joint 42b can pass through the second installation port 52 of the shell 501, and the water outlet device joint 42b is fixed to the pipe joint 43 of the water outlet pipe 41 with a threaded connection. At the same time, the second air holes 521 of the second installation port 52 of the shell 501 may be in fluid communication with the through holes 422 of the water outlet device.

Figure 10:
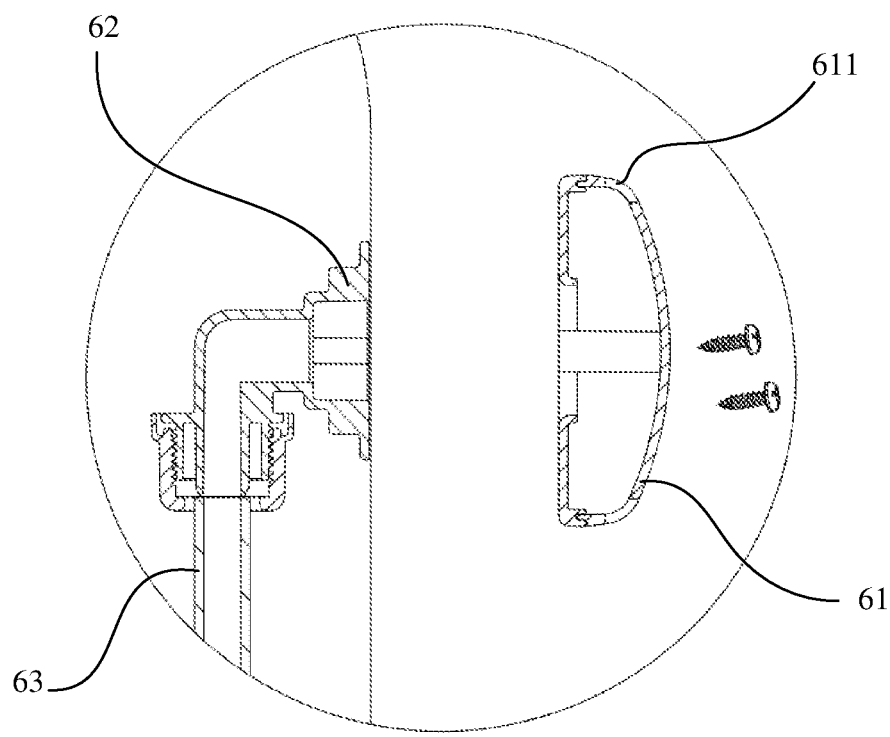
FIG. 10 is an enlarged, cross-sectional view of an air inlet outer cover and an air inlet passage of the air inlet assembly of FIG. 8.

The connection between the water outlet device 42 and the water outlet pipe 41 takes the convenience of disassembly into consideration, while the connection between the air inlet outer cover 61 and the air inlet passage 63 and the connection between the air inlet passage 63 and the shell 501 of the air outlet assembly may include connections configured for ease of assembly and disassembly. For example, as shown in FIG. 8, the air inlet outer cover 61 may be fixedly connected to the first joint 62 connected to the air inlet passage 63 by screws, and the first joint 62 may be mounted to the inner wall of the pool by a rubber coating. Additionally, the first joint 62 may be welded to the inner wall of the pool at high frequency by rubber coating of polyvinyl fluoride (PVC). At the same time, the first joint 62 includes a notch in fluid communication with the air inlet outer cover 61 to facilitate air circulation, as shown in FIG. 10. Similarly, the second joint 64 connected to the air inlet passage 63 may also be mounted to the inner wall of the pool by a rubber coating, and fixedly connected to the first installation port 51 of the shell 501 by screws. The second joint 64 includes a notch in fluid communication with the internal cavity of the shell 501. The notches and the connection interface shown in the figures are merely examples, and a variety of other configurations may be used to perform the same function.

In various embodiments, and as shown in FIG. 11, the shell 501a, 501b of the air outlet assembly 50 may comprise a first shell 501a and a second shell 501b connected to each other so that the first installation port 51 and the second installation port 52 are formed on the first shell 501a and/or the second shell 501b, and the first installation port 51 and the second installation port 52 each include air holes in fluid communication with the internal cavity. Alternatively, the first installation port 51 may be formed on the second shell 501b, and/or the second installation port 52 may be formed on the first shell 501a. In addition, a structural feature matching the first installation port 51 may be formed on the first shell 501a, so that the shell 501a, 501b can be fixedly connected to the second joint 64, for example, by screws. Such a connection may also attach the shell 501a, 501b with the inner wall of the pool. As shown in FIG. 11, the annular wall of the second shell 501b extends axially toward the internal cavity and is perforated to form the first air holes 511 at a position adjacent to the first installation port 51. As also shown in FIG. 11, the first shell 501a extends axially toward the internal cavity to form the recessed portion, and the annular wall of the recessed portion is perforated to form the second air holes 521 at a position adjacent to the second installation port 52. Thus, the first air holes 511 and the second air holes 521 allow air to circulate out of the internal cavity. Of course, the structure of the shell 501a, 501b in this embodiment is merely exemplary.

Figure 12:
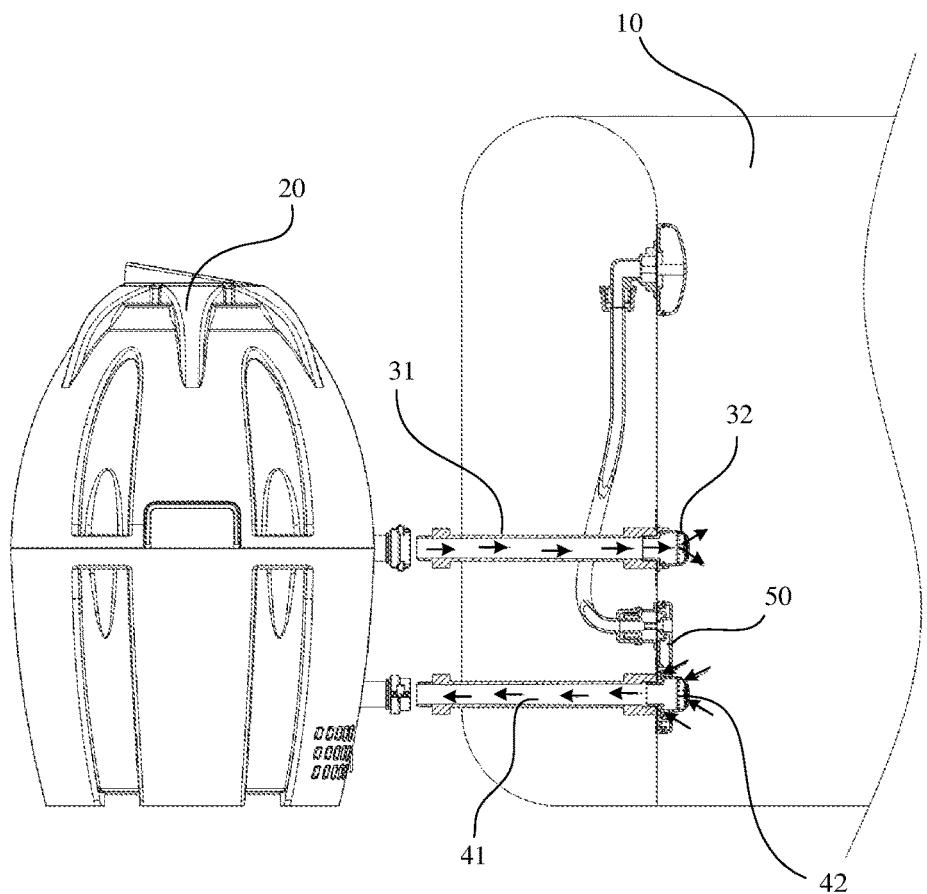
FIG. 12 is a cross-sectional view of a side wall of the pool of FIG. 6, showing a fluid path in the water circulation system when the water outlet device is not blocked.

After the air inlet assembly, the air outlet assembly and the water outlet assembly are assembled, they may be interconnected, as shown in FIG. 12. When in normal use, water flow in the pool 10 enters the water outlet pipe 41 from the water outlet device 42, and then returns to the pool through the pump 20, the water inlet pipe 31, and the water inlet device 32.

Figure 13A:
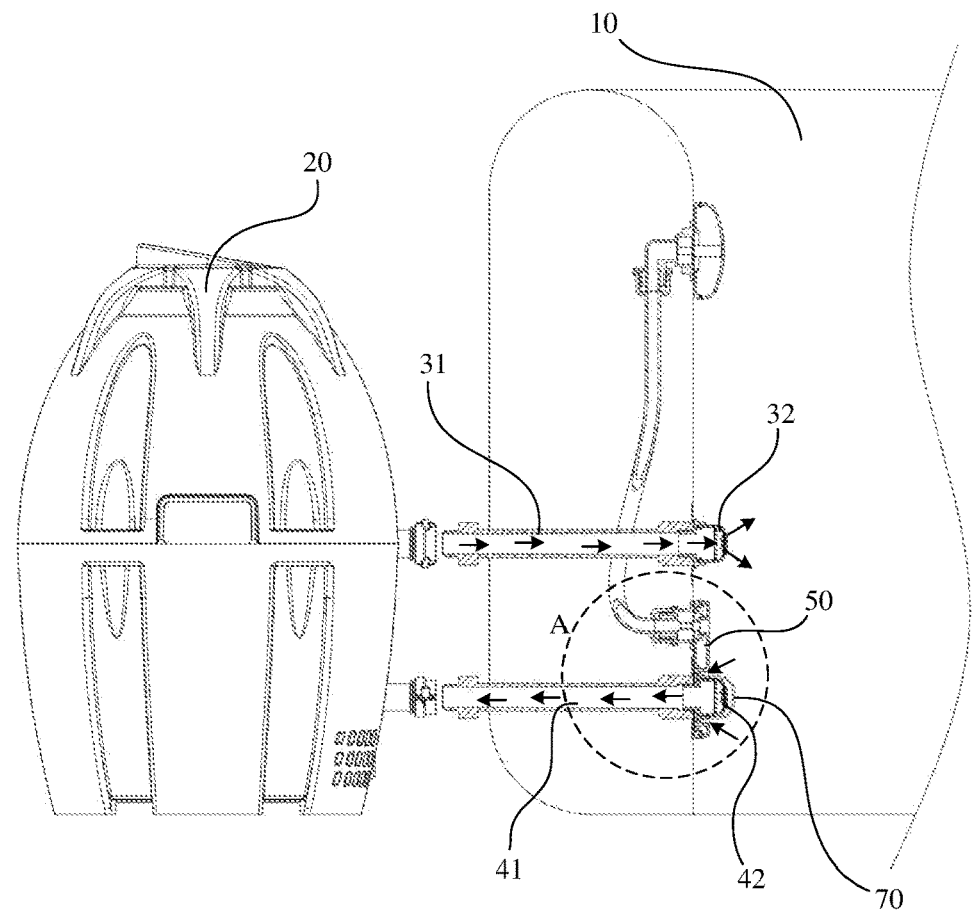
FIG. 13a is a cross-sectional view of a side wall of the pool of FIG. 6, showing a fluid path in the water circulation system when the water outlet device is partially blocked.
Figure 13B:
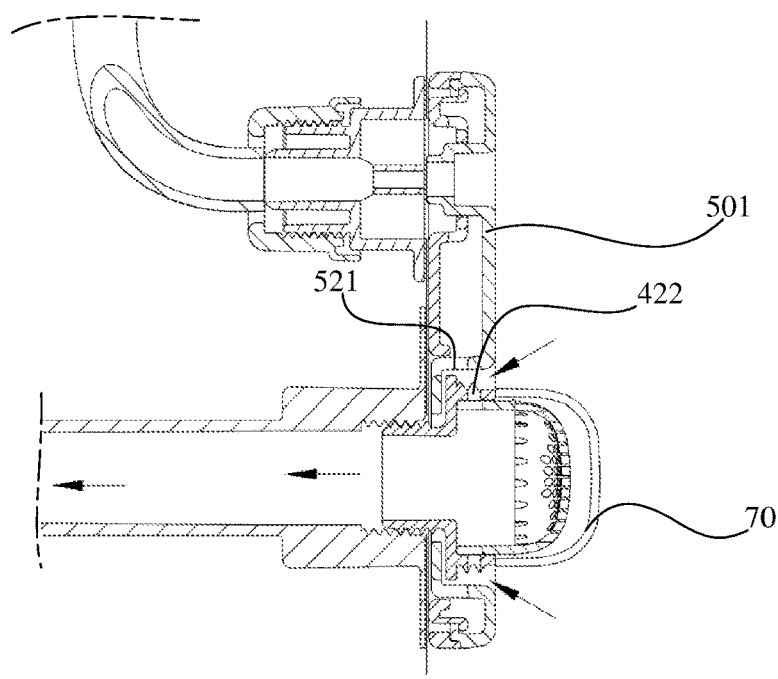

If only the water outlet orifices of the water outlet device 42 are blocked, as shown in FIGS. 13a and 13b, a gap is formed between the outer circumference of the water outlet device 42 and the inner circumference of the recessed portion of the shell 501. This gap provides for fluid communication between the through holes 422 in the circumferential side wall of the water outlet device and the pool, and water flow can continue to flow from the through holes 422 to the water outlet pipe 41 and return to the pool through the pump 20, the water inlet pipe 31, and the water inlet device 32. Such a partial blockage may be caused, for example, by hair, objects, clothes, or other obstructions 70. At this time, although the inlet water flow of the pump may be affected, the through holes 422 of the water outlet device can still be used as water outlet orifices. If the gap between the outer circumference of the water outlet device and the inner circumference of the recessed portion is very small, the fluid inside of the air outlet assembly may partially flow into the through holes 422 of the water outlet device through the second air holes 521.

Figure 14A:
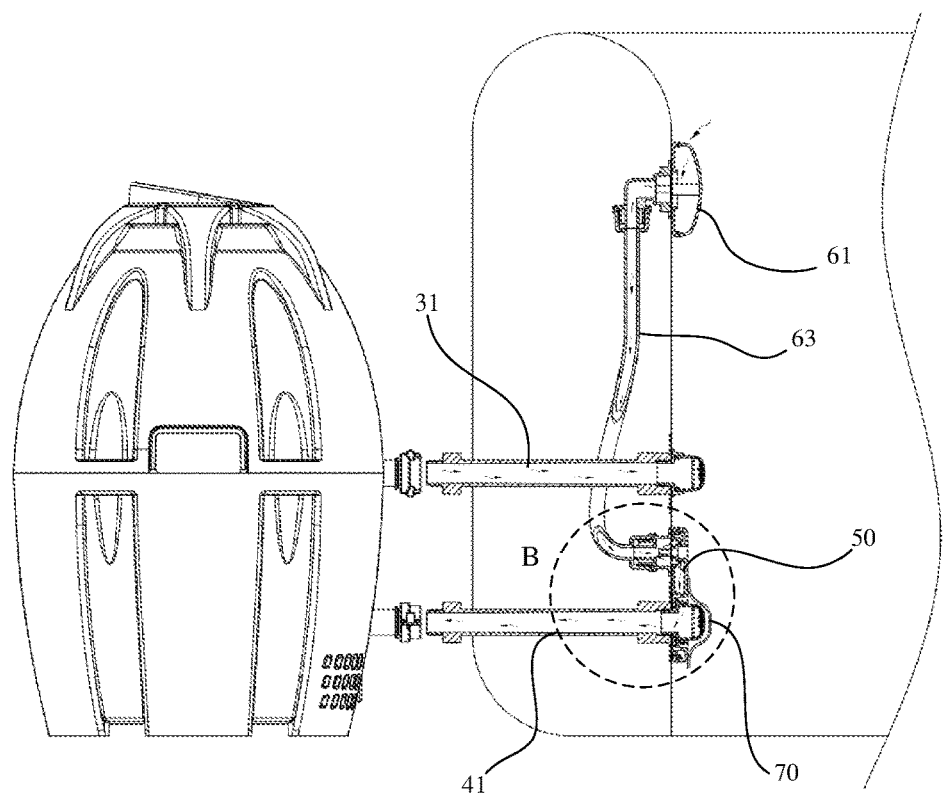
FIG. 14a is a cross-sectional view of a side wall of the pool of FIG. 6, showing a fluid path in the water circulation system when the water outlet device is completely blocked.
Figure 14B:
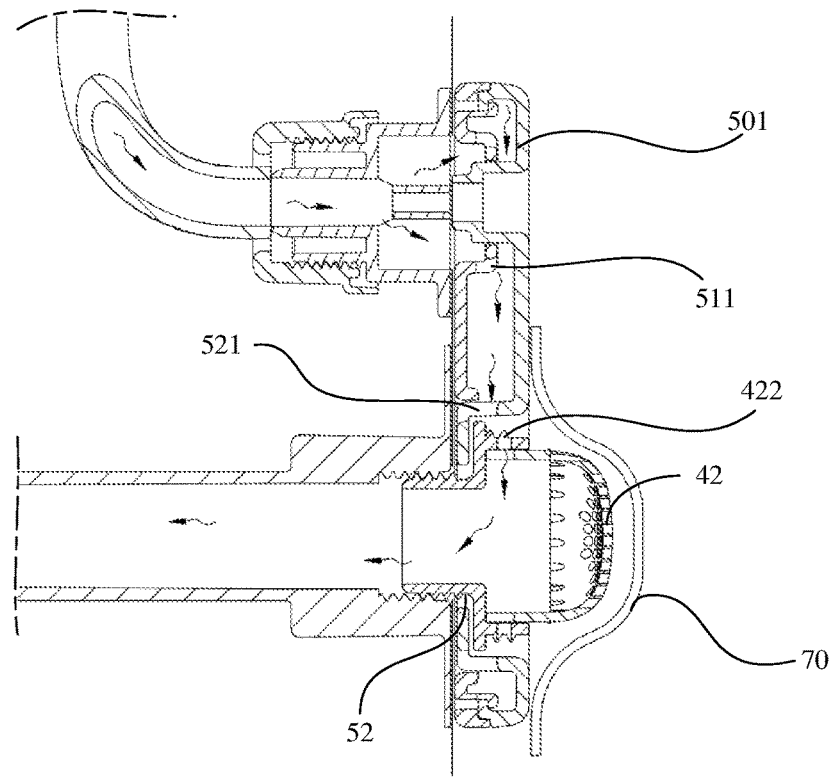

When the water outlet device is completely blocked by the obstruction 70, for example, when the water outlet device is blocked by a portion of a user's body, the gap between the outer circumference of the water outlet device and the inner circumference of the recessed portion is also blocked, as shown in FIGS. 14a and 14b. In this case, water cannot flow in smoothly from the water outlet device 42; the water outlet device 42 and the shell 501 form a relatively closed space; and the through holes 422 of the water outlet device are in fluid communication with the second air holes 521 of the shell 501. The pump continues to operate, drawing air from the air inlet outer cover 61. Air enters the internal cavity of the shell 501 via the air inlet passage 63 and the first air holes 511 of the shell 501, flows out from the second air holes 521 of the shell 501, enters the water outlet device 42 via the through holes 422 of the water outlet device, passes through the water outlet pipe 41, the pump 20, the water inlet pipe 31 and the water inlet device 32, returning to the pool and the outside (atmosphere). At this time, the through holes 422 of the water outlet device are completely used as air inlets. The air in the fluid path continues to circulate, and the negative pressure at the water outlet device is reduced, allowing a portion of a user's body to more easily escape from the water outlet, reducing the risk of injury.

Figure 15A:
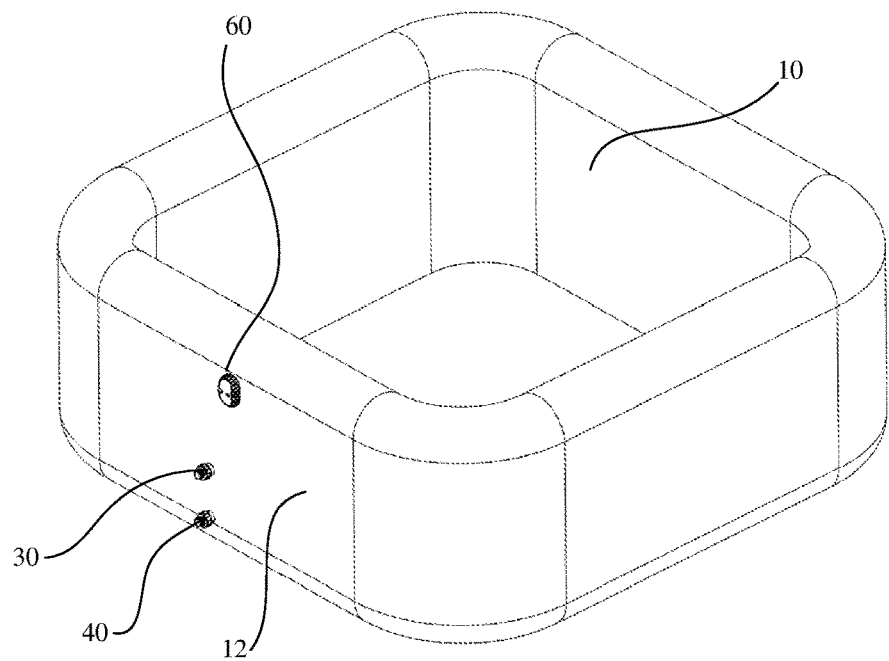
FIG. 15a is a perspective view of a pool including a water circulation system according to various embodiments of the present disclosure.
Figure 15B:
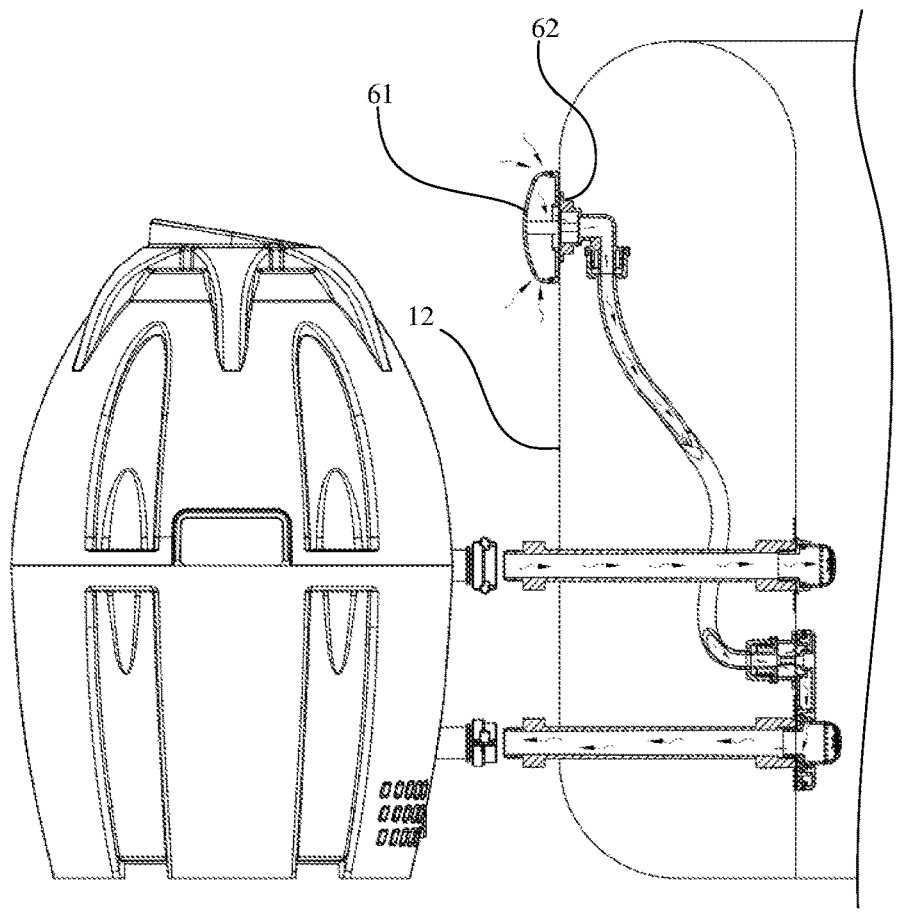
FIG. 15b is a cross-sectional view of a side wall of the pool of FIG. 15a, including the water circulation system.

FIGS. 15a and 15b show a water circulation system for a pool according to a sixth embodiment. This sixth embodiment is different from the fifth embodiment of FIGS. 6-7 in that the air inlet outer cover 61 of the air inlet assembly 60 is mounted to the outer wall 12 of the pool. In this way, the air inlets of the air inlet outer cover 61 are kept unblocked, and also the inner wall of the pool is simplified, thereby increasing the usable area of the pool and improving the user experience. In the illustrated embodiment, the air inlet outer cover 61 is located at the upper part of the outer wall 12. Since the air inlets are continuously unblocked, in an alternative embodiment, the position of the air inlet outer cover 61 on the outer wall 12 is not limited, for example, it could be located at the middle, lower, or other parts of the outer wall 12.

Figure 16A:
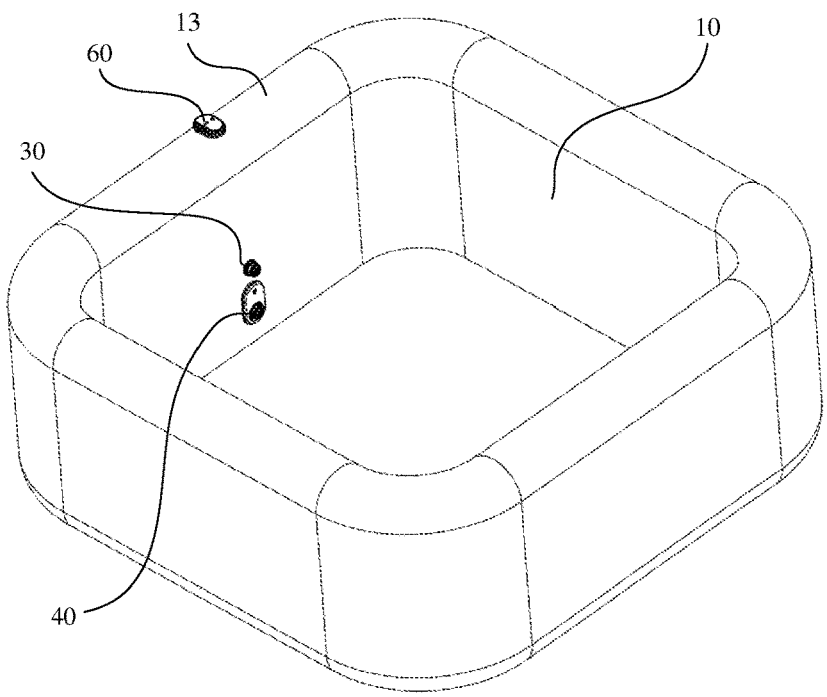
FIG. 16a is a perspective view of a pool including a water circulation system according to various embodiments of the present disclosure.
Figure 16B:
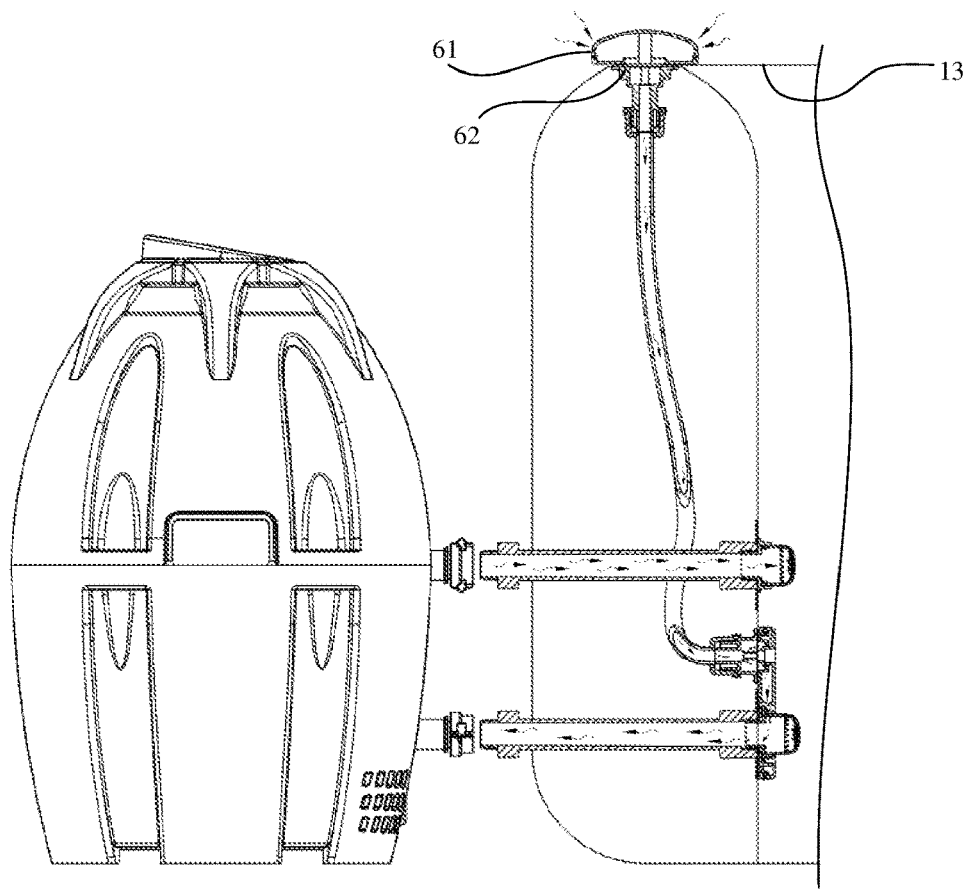
FIG. 16b is a cross-sectional view of a side wall of the pool of FIG. 16a, including the water circulation system.

FIGS. 16a and 16b show a water circulation system for a pool according to a seventh embodiment. This seventh embodiment is different from the fifth embodiment of FIGS. 6-7 in that the air inlet outer cover 61 of the air inlet assembly 60 is mounted to a top wall 13 of the pool. Such an arrangement also helps to keep the air inlets of the air inlet outer cover 61 continuously unblocked, thus improving the user experience.

FIGS. 17a to 17g show a water circulation system according to an eighth embodiment. This eighth embodiment is different from the fifth embodiment of FIGS. 6-7 in that the air inlet passage 63 is arranged in a pool body of the pool 10 and adjacent to the inner wall 11 of the pool. The term, "pool body," means an interior space of the pool for containing water. Compared with the air inlet passage formed through the internal cavity of the shell 91 in the above embodiment, the air inlet passage 63 may be in the form of a flexible hose that is easy to bend and will not produce adverse effects on the user. Compared with the air inlet passage arranged, for example, in the inflatable chamber of the pool in the above embodiment, the air inlet passage of this embodiment is easier to maintain and replace.

Figure 17A:
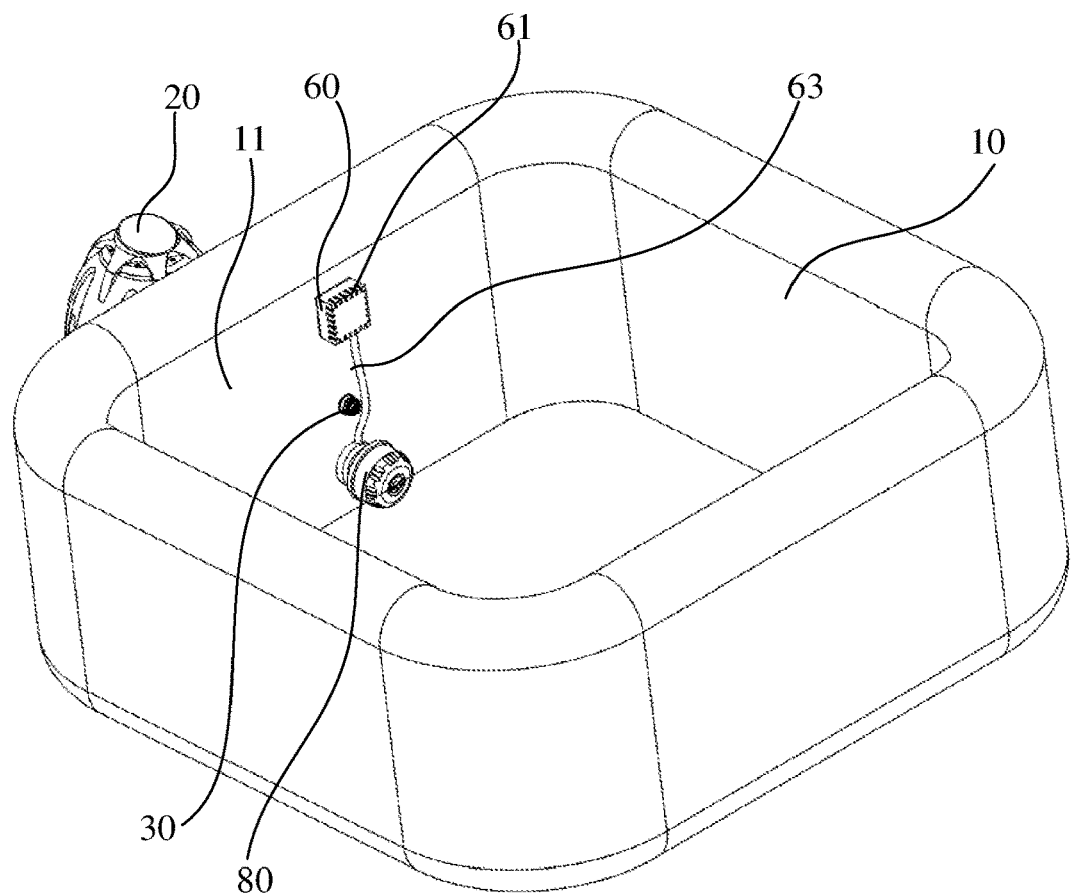
FIG. 17a is a perspective view of a pool including a water circulation system according to various embodiments of the present disclosure.
Figure 17B:
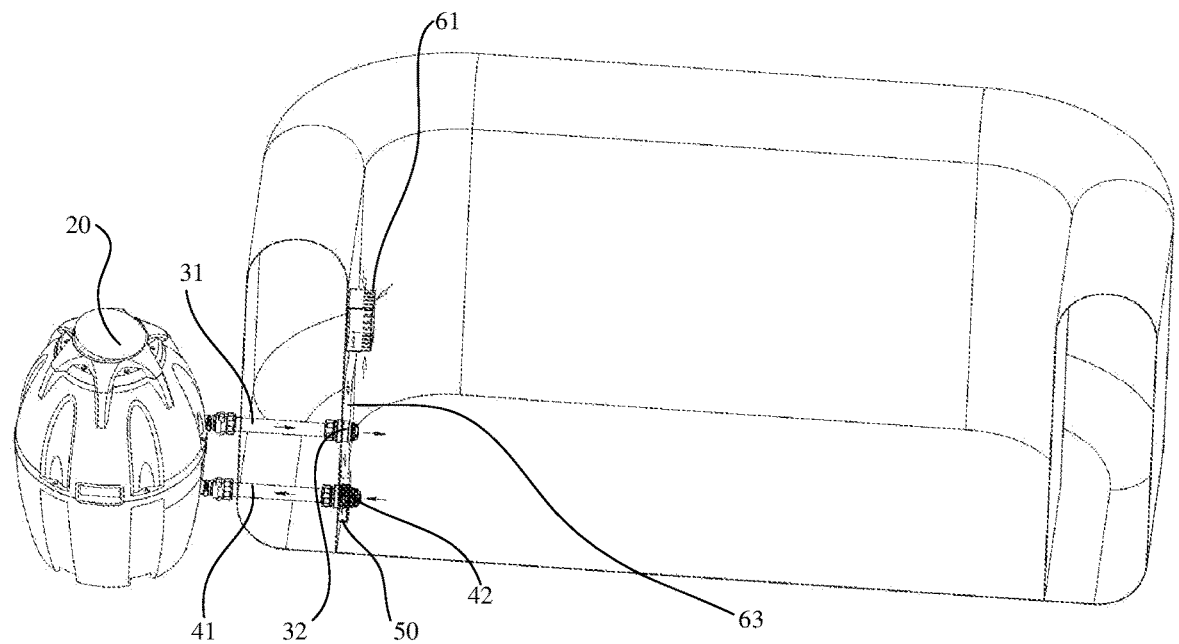
FIG. 17b is a cross-sectional view of the pool of FIG. 17a, including the water circulation system without a filter connected thereto.
Figure 17C:
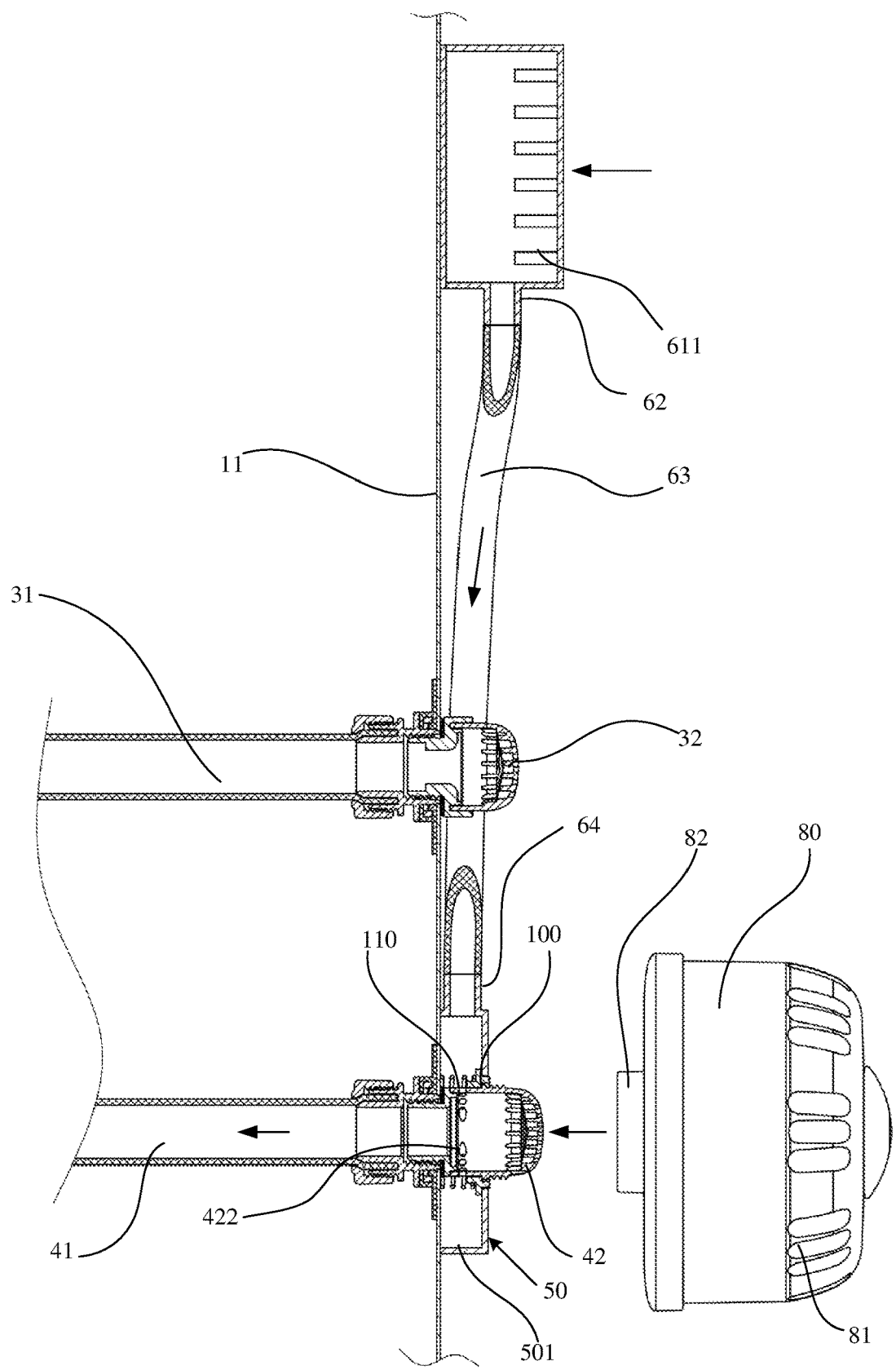
FIG. 17c is a cross-sectional view of an inner wall of the pool of FIG. 17a, showing a fluid path in the water circulation system without a filter connected thereto.
Figure 17D:
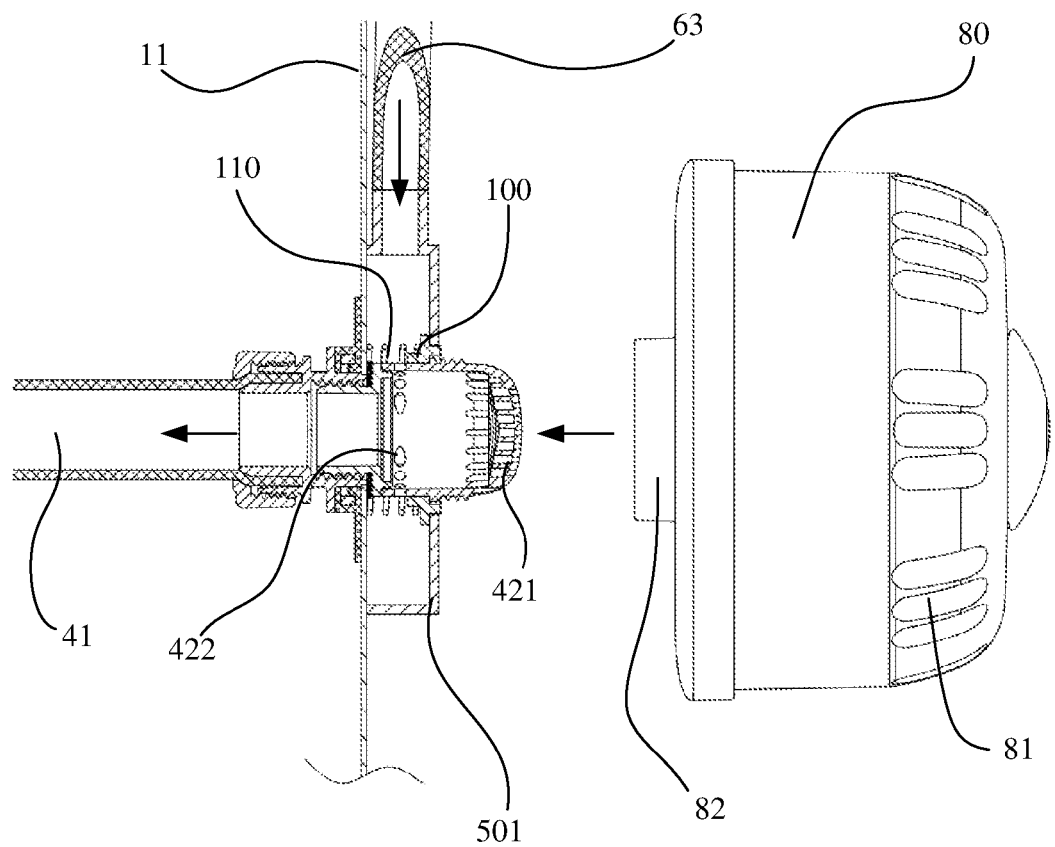
FIG. 17d is an enlarged view of a portion of FIG. 17c, showing a fluid path at a water outlet of the water circulation system without a filter connected thereto.
Figure 17E:
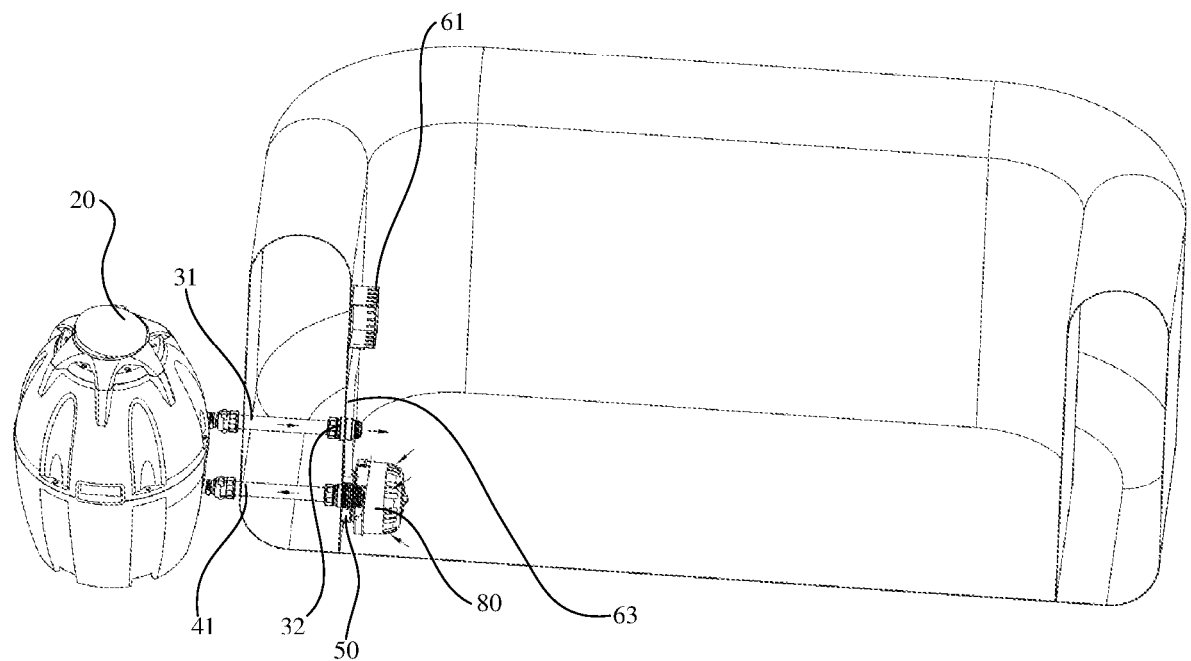
FIG. 17e is a cross-sectional view of the pool of FIG. 17a, including the water circulation system with a filter connected thereto.
Figure 17F:
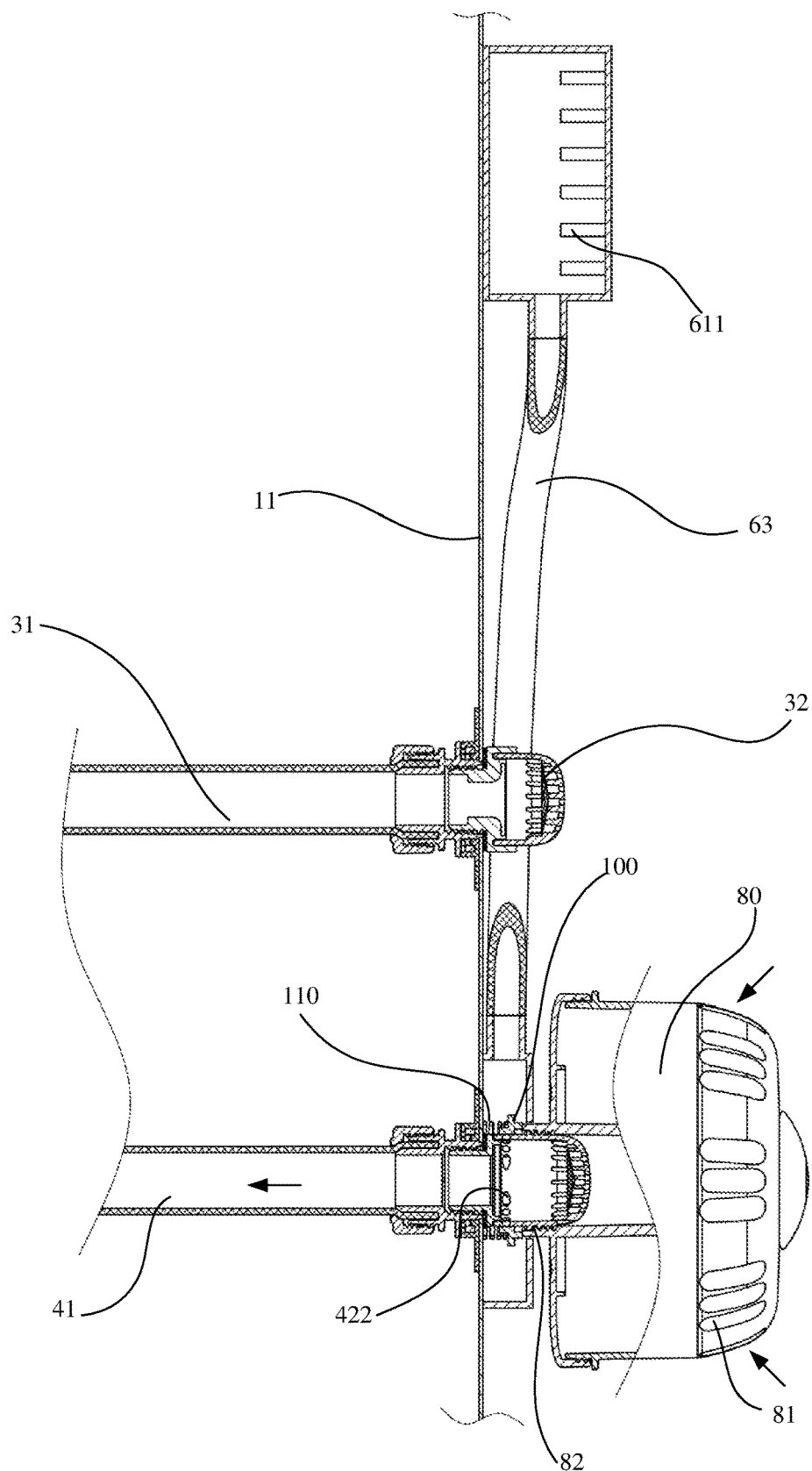
FIG. 17f is a cross-sectional view of an inner wall of the pool of FIG. 17a, showing a fluid path in the water circulation system with a filter connected thereto.
Figure 17G:
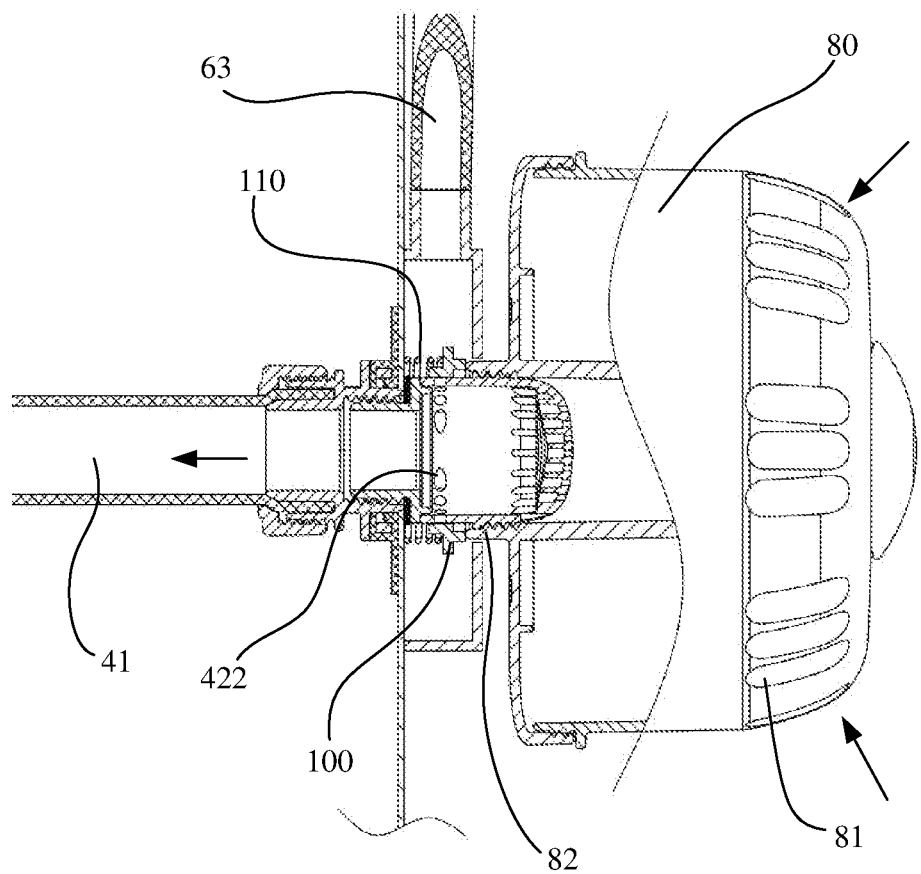
FIG. 17g is an enlarged view of a portion of FIG. 17f, showing a fluid path at the water outlet of the water circulation system with a filter connected thereto.

Thus, when the filter 80 is not connected to the water outlet assembly 40, as shown in FIGS. 17b to 17d, part of the fluid flow (including air and/or water) enters the shell 501 from the air inlets 611 of the air inlet outer cover 61 along the air inlet passage 63, as indicated by the depicted arrows, and then enters the water outlet pipe 41 from the shell 501 via the through holes 422 of the water outlet device 42. At the same time, the other part of the fluid flow enters the water outlet pipe 41 through the water outlet orifices 421 of the water outlet device 42. After the filter 80 is installed to the water outlet assembly 40, as shown in FIGS. 17e to 17g, the connection interface 82 of the filter 80 abuts against the base 100, urging the base 100 to move towards the water outlet pipe 41 and then squeezing the elastic member 110, causing the base 100 to block the through holes 422 in the side wall of the water outlet device 42. Water flows in from the filter ports 81 of the filter 80, as indicated by the depicted arrows, and then returns to the pool via the water outlet pipe 41, the pump 20, the water inlet pipe 31 and the water inlet device 32.

Figure 18A:
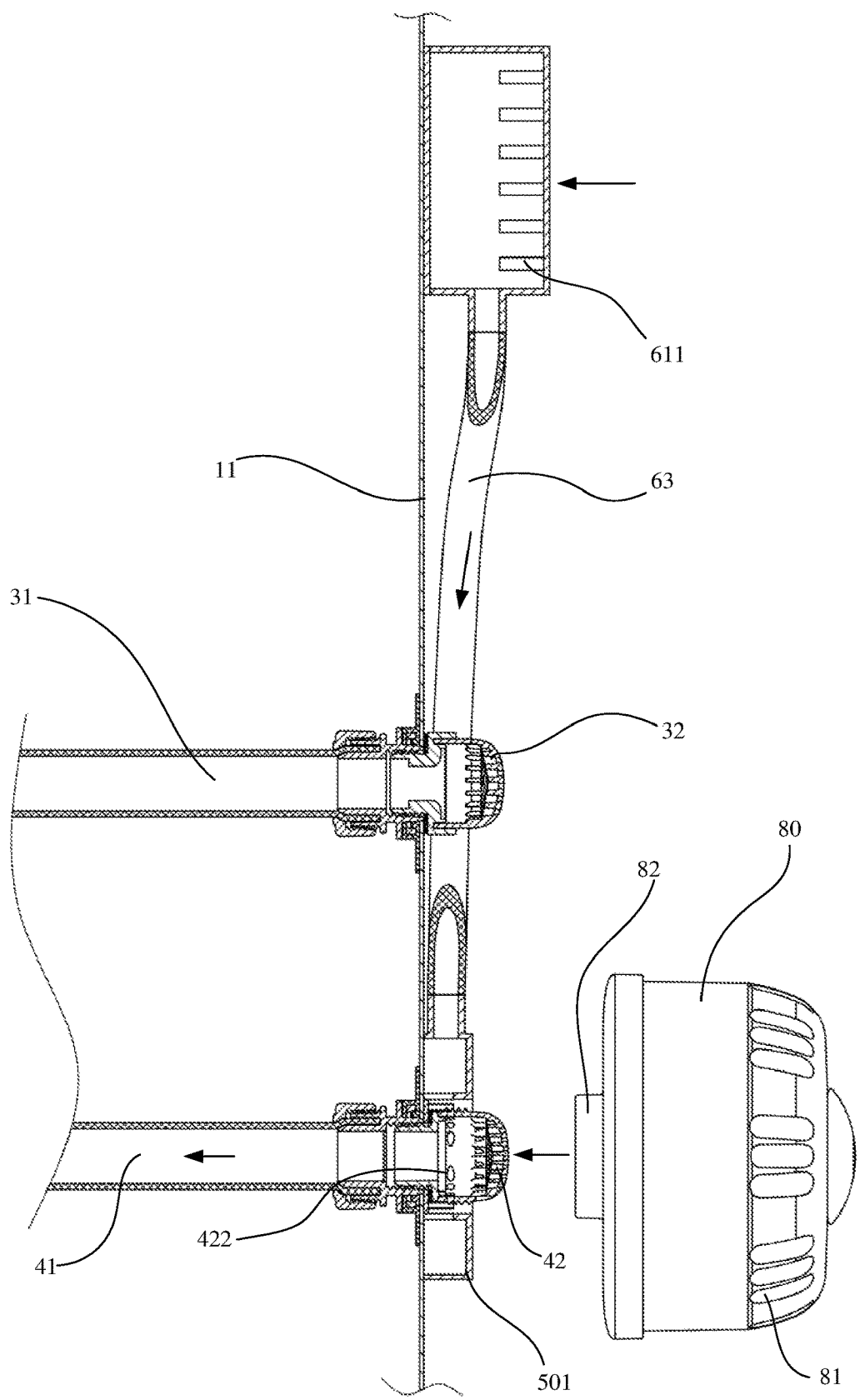
FIG. 18a is a cross-sectional view of an inner wall of the pool according to various embodiments of the present disclosure, showing a fluid path in the water circulation system without a filter connected thereto.
Figure 18B:
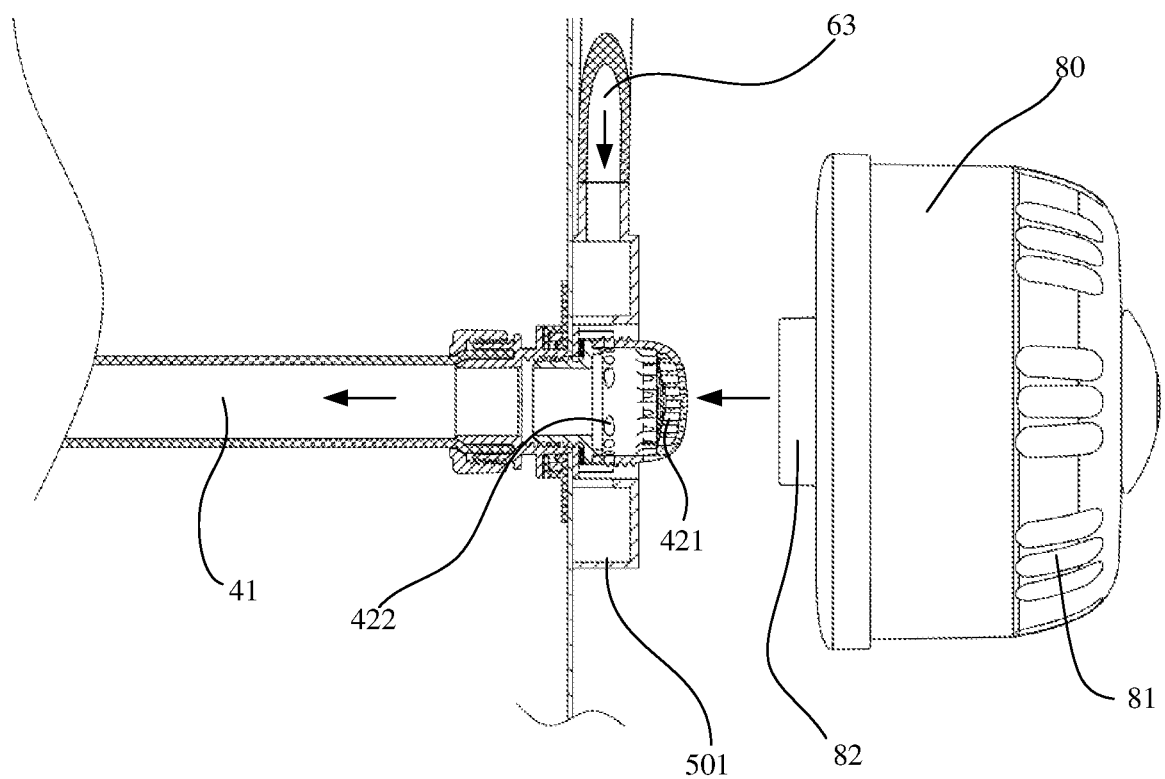
FIG. 18b is an enlarged view of a portion of FIG. 18a, showing a fluid path at the water outlet of the water circulation system without a filter connected thereto.
Figure 18C:
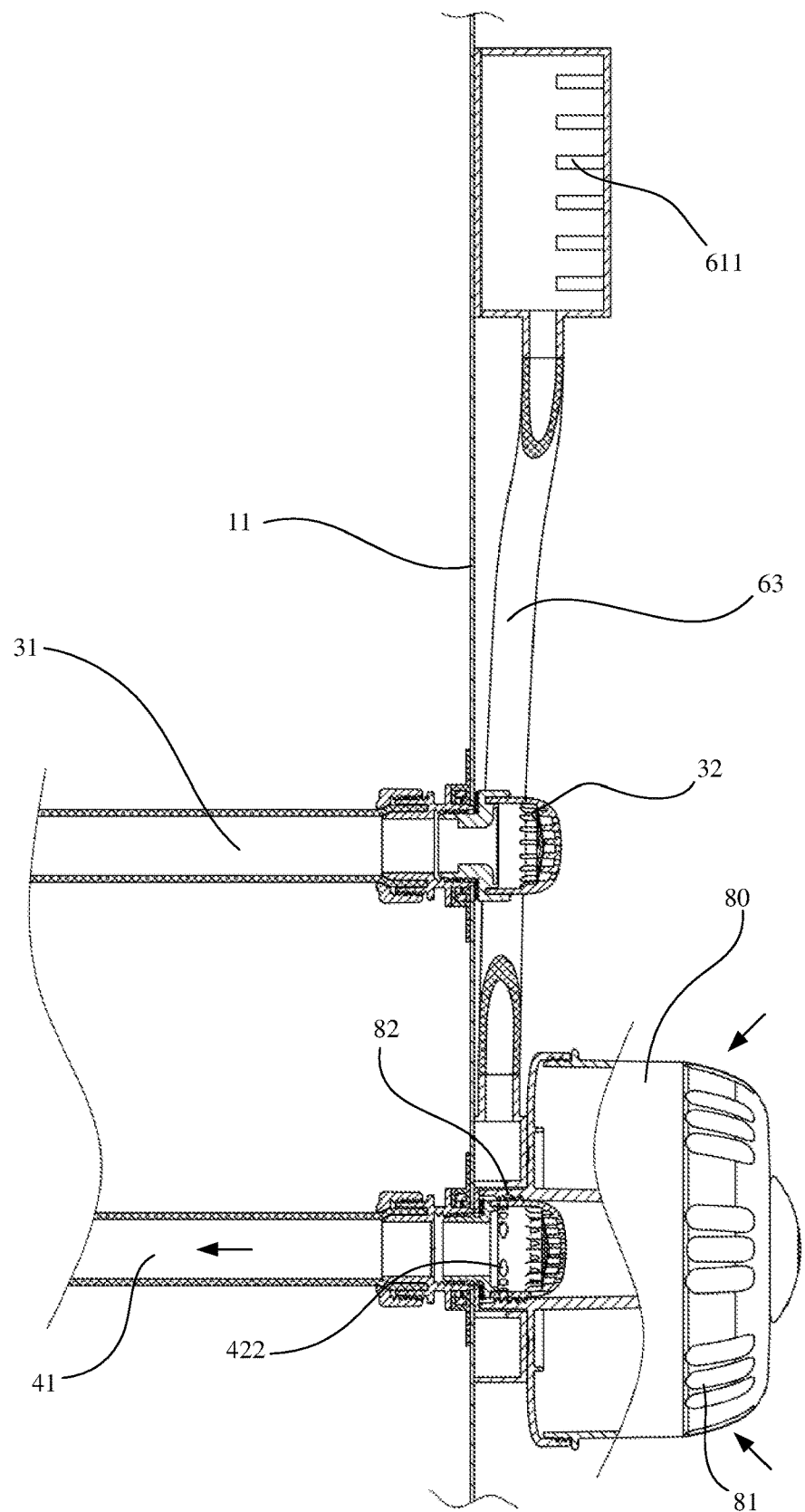
FIG. 18c is a cross-sectional view of the inner wall of the pool of FIG. 18a, showing a fluid path in the water circulation system with a filter connected thereto.
Figure 18D:
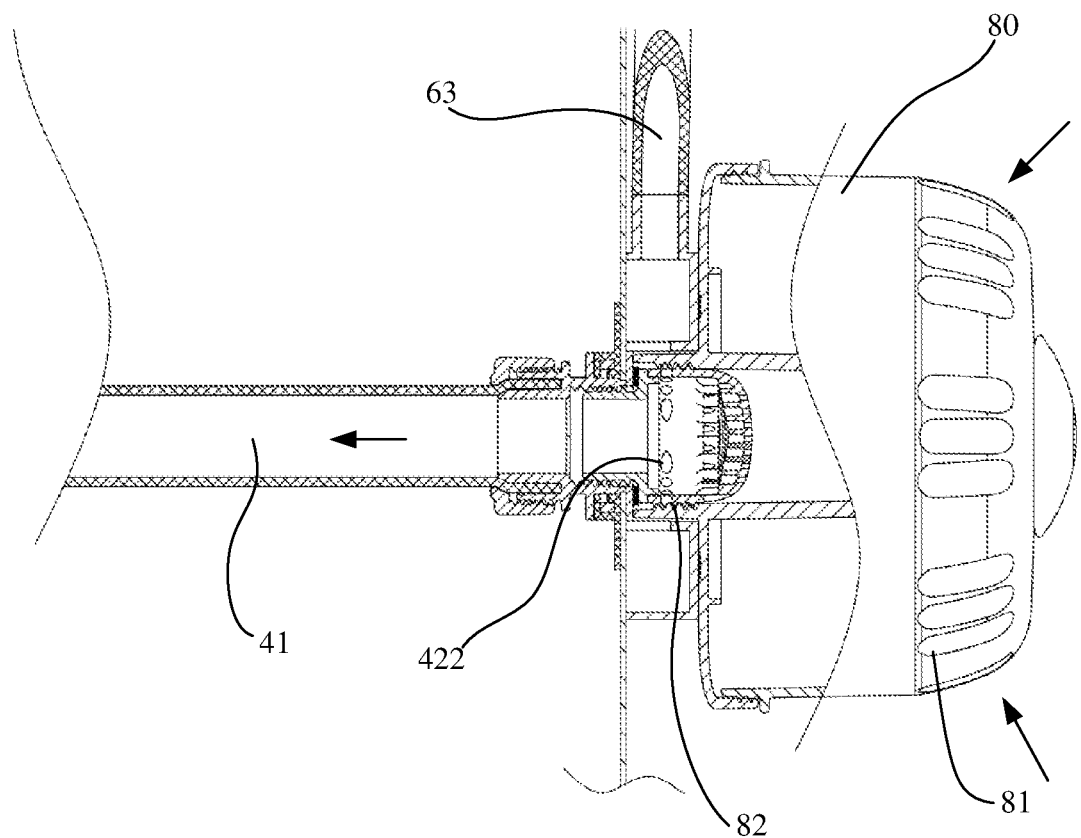
FIG. 18d is an enlarged view of a portion of FIG. 18c, showing a fluid path at the water outlet of the water circulation system with the filter connected thereto.

FIGS. 18a to 18d show a water circulation system according to a ninth embodiment. This ninth embodiment is different from the eighth embodiment of FIGS. 17a to 17g in that the water outlet device 42 does not include an elastic member or a base. Similar to the fourth embodiment, as shown in FIGS. 5a to 5d, the shell of the water outlet assembly includes an annular wall 502 extending axially toward the inside of the internal cavity, and an opening 503 formed on the annular wall 502. Thus, when the filter 80 is connected to the water outlet device 42 of the water outlet assembly, the connection interface 82 of the filter 80 serves as a water flow blocking member to block the through holes 422, and thus, as shown in FIGS. 18c and 18d, water flow can only flow into the water outlet pipe 41 from the filter ports 81 of the filter 80, as indicated by the depicted arrows.

Regardless of the implementation details, the water circulation system for a pool according to the present disclosure can reliably circulate and filter water in the pool and ensure the personal safety of users. Unless otherwise defined, the term "flexible" means providing for some relative motion between components. The components and features described herein may be made of various materials that include, but are not limited to, any suitable materials, such as polymers, rubber, foam and metal, or combinations of materials, which may be known to those skilled in the art.

It should be understood that the embodiments as shown in the drawings only show exemplary shapes, sizes and arrangements of optional components of the water circulation system for a pool, which are merely illustrative but not restrictive, and other shapes, sizes and arrangements may be employed without departing from the idea and scope of the present disclosure.

Although various embodiments have been described by way of examples herein, various changes could be made to these embodiments without departing from the spirit of the present disclosure. All such variations belong to the conception of the present disclosure and fall within the scope of protection defined by the claims of the present disclosure. The specific embodiments disclosed herein are merely illustrative of the present disclosure. It would be apparent to those skilled in the art that various modifications could be made according to the teachings of the present disclosure, and the present disclosure could be practiced in various equivalent ways. Thus, the particular embodiments of the present invention, as disclosed herein, are illustrative only, and the scope of protection of the present disclosure is not limited by the details of the structures or designs disclosed herein. Accordingly, various substitutions, combinations, or modifications could be made to the particular exemplary embodiments disclosed herein, and all variations thereof fall within the scope of the present disclosure.

What is claimed is:

1. A water circulation system, comprising:
a water outlet assembly defining a fluid passage comprising a first end configured to mount to an inner wall of a pool and a second end configured to connect to a water outlet pipe, the water outlet assembly comprising:
a water outlet device connected to the first end of the fluid passage, the water outlet device comprising a plurality of water outlet orifices configured to draw water therethrough into the fluid passage and to block entry into the fluid passage of a foreign object;

an air inlet assembly, and air outlet assembly, and an air inlet passage connected between the air inlet assembly and the air outlet assembly and providing fluid communication between the air inlet assembly and the air outlet assembly;

wherein the water outlet assembly comprises a through hole therein;

wherein the air outlet assembly is in fluid communication, via the through hole in the water outlet assembly, with the fluid passage in the water outlet assembly.

2. The water circulation system for a pool according to claim 1, wherein the air inlet assembly comprises an air inlet cover having a plurality of air inlets formed therethrough.

3. The water circulation system according to claim 1, further comprising:

a filter configured to attach to the water outlet assembly;

wherein the air outlet assembly is in fluid communication with the water outlet assembly when the water outlet assembly is not connected to the filter, and wherein the air outlet assembly is not in fluid communication with the water outlet assembly when the water outlet assembly is connected to the filter.

4. The water circulation system according to claim 3, further comprising a flow blocking member configured to selectively block fluid communication between the through hole of the water outlet device and the water outlet assembly.

5. The water circulation system according to claim 4, wherein the flow blocking member comprises a connection interface of the filter.

6. The water circulation system according to claim 4, further comprising a base disposed inside a housing of the air outlet assembly and an elastic member sheathed on a side wall of the water outlet device, wherein the elastic member is configured to bias the base away from the inner wall of the housing of the air outlet assembly; and wherein the flow blocking member comprises the base.

7. A pool comprising:

an inner wall defining a pool cavity therein;

a water circulation system comprising:

a water outlet assembly defining a fluid passage therein, the water outlet assembly comprising:

a water outlet device mounted to the inner wall of the pool at a first end of the water outlet assembly, the water outlet device comprising a plurality of water outlet orifices configured to draw water therethrough from the pool cavity into the fluid passage and to block entry into the fluid passage of a foreign object;

an air inlet assembly, an air outlet assembly, and an air inlet passage connected between the air inlet assembly and the air outlet assembly and providing fluid communication between the air inlet assembly and the air outlet assembly;

wherein the water outlet assembly comprises a through hole therein and the air outlet assembly is in fluid communication, via the through hole in the water outlet assembly, with the fluid passage in the water outlet assembly.

8. The pool according to claim 7, further comprising:

an outer wall, wherein the air inlet passage is disposed in one of a first location between the inner wall of the pool and the outer wall of the pool and a second location within the pool cavity, wherein the air inlet assembly comprises an air inlet cover and a first joint connecting the air inlet cover to the air inlet passage and a second joint connecting the air outlet assembly to the air inlet passage.

9. The pool according to claim 8, wherein one of the first joint and the second joint is fixed with a rubber coating to one of the inner wall of the pool, a top wall of the pool, and the outer wall of the pool.

10. The pool according to claim 8, wherein one of the first joint and the second joint is integrally formed with one of the air inlet cover and the air outlet assembly.

11. The pool according to claim 7, wherein the air outlet assembly comprises a housing fixed to the inner wall of the pool, the housing comprising:

an installation port configured to receive therein the water outlet assembly;

a plurality of air inlets disposed above a desired water level of the pool; and an internal cavity defining the air inlet passage.

12. The pool according to claim 7, wherein the air outlet assembly comprises a housing fixed to the inner wall of the pool, the housing comprising:

a first installation port receiving therein the air inlet passage, a second installation port receiving therein the water outlet assembly, and an internal cavity through which the air inlet passage is in fluid communication with the water outlet assembly.

13. The pool according to claim 12, wherein the housing of the air outlet assembly further comprises a first shell and a second shell connected to the first shell, wherein at least one of the first shell and the second shell defines the first installation port and the second installation port, and wherein each of the first installation port and the second installation port comprises air holes therethrough in fluid communication with the internal cavity.

14. The pool according to claim 12, further comprising:

a pump and a water outlet pipe connected to the pump;

wherein the water outlet assembly comprises a water outlet device connected to the pump via the water outlet pipe.

15. The pool according to claim 14, wherein the through hole in the water outlet assembly comprises a plurality of through holes circumferentially arranged around a circumferential side wall of the water outlet assembly.

16. The pool according to claim 14, wherein the water outlet device is connected to the water outlet pipe via a water outlet device joint, and wherein the through hole in the water outlet assembly comprises a plurality of through holes located inside of the water outlet device joint.

17. The pool according to claim 14, wherein the water outlet assembly comprises a water outlet pipe connector connecting the water outlet device to the water outlet pipe;

wherein the water outlet pipe connector comprises a water outlet pipe joint connected to a water outlet device joint, wherein the water outlet pipe joint is connected directly to the water outlet pipe, and the water outlet device joint is connected directly to the water outlet device.

18. The pool according to claim 17,
wherein the water outlet pipe connector further comprises a flexible connector attached to the inner wall of the pool, and
wherein the water outlet pipe joint is attached to the inner wall of the pool by the flexible connector.

19. The pool according to claim 18,
wherein the water outlet pipe joint is connected to the flexible connector by secondary injection molding.

20. The pool according to claim 14,
wherein the housing of the air outlet assembly and the water outlet assembly form a substantially closed space when the water outlet assembly is blocked.

21. The pool according to claim 7,
wherein the air inlet assembly is mounted to the inner wall of the pool, and the fluid comprises water from the pool.

22. A water circulation device, comprising:
a water inlet assembly configured to mount to an inner wall of a pool and configured to be connected in fluid communication with a water inlet pipe;
a water outlet assembly configured to mounted to the inner wall of the pool and configured to be connected in fluid communication with a water outlet pipe; and
an auxiliary suction assembly mounted to the inner wall of the pool;
wherein the auxiliary suction assembly is configured to be in fluid communication with the water outlet assembly when the water outlet assembly is disconnected from a filter; and
wherein the auxiliary suction assembly is configured to be blocked from fluid communication with the water outlet assembly when the water outlet assembly is connected to the filter.

23. A pool comprising the water circulation device according to claim 22.

24. A water circulation system, comprising:
a water outlet assembly configured to be mounted to an inner wall of a pool, and configured to draw water out of the pool;
an air inlet assembly configured to be mounted to the pool at a distance from the water outlet assembly and configured to draw in ambient air;
an air outlet assembly in communication with the water outlet assembly and configured to introduce air to the water outlet assembly when the water outlet assembly is blocked; and
an air inlet passage configured to convey air from the air inlet assembly to the water outlet assembly.

25. The water circulation system according to claim 24,
wherein the pool is an inflatable pool, and
wherein the air inlet passage is configured to be disposed in an air chamber of the inflatable pool.

26. A water circulation device, comprising:
a water outlet assembly configured to be mounted to an inner wall of a pool, and configured to draw water out of the pool; and
an auxiliary suction assembly configured to be mounted to the inner wall of the pool;
wherein the auxiliary suction assembly is configured to be in fluid communication with the water outlet assembly when the water outlet assembly is disconnected from a filter; and
wherein the auxiliary suction assembly is configured to be blocked from fluid communication with the water outlet assembly when the water outlet assembly is connected to the filter.

\* \* \* \* \*